US011961169B2

(12) United States Patent
Troutman et al.

(10) Patent No.: US 11,961,169 B2
(45) Date of Patent: Apr. 16, 2024

(54) DIGITAL MAKEUP ARTIST

(71) Applicant: L'OREAL, Paris (FR)

(72) Inventors: Mindy Christine Troutman, New York, NY (US); Sandrine Gadol, New York, NY (US); Francesca Cruz, Sleepy Hollow, NY (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 18/180,521

(22) Filed: Mar. 8, 2023

(65) Prior Publication Data

US 2023/0222720 A1 Jul. 13, 2023

Related U.S. Application Data

(63) Continuation of application No. 17/138,078, filed on Dec. 30, 2020, now Pat. No. 11,657,553.

(51) Int. Cl.
*G06T 11/60* (2006.01)
*G06N 20/00* (2019.01)
(Continued)

(52) U.S. Cl.
CPC .............. *G06T 11/60* (2013.01); *G06N 20/00* (2019.01); *G06T 11/001* (2013.01);
(Continued)

(58) Field of Classification Search
CPC ... G06T 11/60; G06T 11/001; G06T 2200/24; G06N 20/00; G06N 3/045; G06V 40/165;
(Continued)

(56) References Cited

U.S. PATENT DOCUMENTS 10,381,105 B1 8/2019 Tran
10,952,519 B1 3/2021 Hayman
(Continued)

OTHER PUBLICATIONS

Preliminary Search Report and Written Opinion dated Apr. 4, 2022, in corresponding French Patent Application No. 2107909 (with English Translation of Category of Cited Documents), 10 pages.

*Primary Examiner* — Said Broome
*Assistant Examiner* — Andrew Shin
(74) *Attorney, Agent, or Firm* — Oblon, McClelland, Maier & Neustadt, L.L.P.

(57) ABSTRACT

A digital makeup artist system includes a mobile device, a database system storing cosmetic routine information, common makeup looks, cosmetic products for skin types and ethnicity, and user look preferences of a user. The mobile device includes a user interface for interacting with a digital makeup artist. The digital makeup artist performs an interactive dialog with the user in order to capture needs of the user, including types of makeup look, indoor or outdoor look, skin condition, facial problem areas, favorite facial features. The computation circuitry analyzes the user's face image to identify face parts, analyzes the face image to determine facial characteristics, and generates image frames to be displayed in synchronization with the interaction with the digital makeup artist based on the analyzed face image, needs of the user, the stored cosmetic routine information, common makeup looks, cosmetic products for skin types and ethnicity, and the user look preferences.

20 Claims, 35 Drawing Sheets

(51) Int. Cl.
*G06T 11/00* (2006.01)
*G06V 40/16* (2022.01)
*G10L 15/22* (2006.01)

(52) U.S. Cl.
CPC .......... *G06V 40/165* (2022.01); *G06V 40/166* (2022.01); *G06V 40/171* (2022.01); *G10L 15/22* (2013.01); *G10L 2015/223* (2013.01)

(58) Field of Classification Search
CPC .... G06V 40/166; G06V 40/171; G06V 10/82; G10L 15/22; G10L 2015/223; G06F 3/167
See application file for complete search history.

(56) References Cited

U.S. PATENT DOCUMENTS

| | | |
|---|---|---|
| 11,010,894 B1 | 5/2021 | Shenk |
| 11,178,956 B1 | 11/2021 | Prout |
| 2003/0065524 A1 | 4/2003 | Giacchetti |
| 2003/0065636 A1 | 4/2003 | Peyrelevade |
| 2016/0093081 A1 | 3/2016 | Kim et al. |
| 2018/0060919 A1 | 3/2018 | Gu |
| 2018/0075524 A1 | 3/2018 | Sartori Odizzio et al. |
| 2019/0208893 A1 | 7/2019 | Besen et al. |
| 2020/0305579 A1 | 10/2020 | Yang |
| 2021/0015241 A1 | 1/2021 | Kuang |

1100

| Look-Makeup | Lipstick | | | | | | Eye Shadow | | | | |
|---|---|---|---|---|---|---|---|---|---|---|---|
| Feature | Makeup Filter | Color | Cover | Shade | Finish | Applicator | Makeup Filter | Color | Cover | Shade | Finish | Applicator |
| Date night Universal | | | | | | | | | | | |
| Preference-previous | | | | | | | | | | | |
| Favorite-previous | | | | | | | | | | | |
| Girl's night out | | | | | | | | | | | |
| Special date | | | | | | | | | | | |
| Holiday | | | | | | | | | | | |
| Going out with mother-in-law | | | | | | | | | | | |
| New year's eve party | | | | | | | | | | | |
| Bridal prom | | | | | | | | | | | |
| Spring | | | | | | | | | | | |
| Summer | | | | | | | | | | | |
| Fall | | | | | | | | | | | |
| Quick makeup | | | | | | | | | | | |
| Average makeup | | | | | | | | | | | |
| Take-your-time makeup | | | | | | | | | | | |
| cheery | | | | | | | | | | | |
| happy | | | | | | | | | | | |
| Notice-me | | | | | | | | | | | |

Fig. 11

DIGITAL MAKEUP ARTIST

CROSS-REFERENCE TO RELATED APPLICATIONS

This application is a continuation of U.S. application Ser. No. 17/138,078, filed Dec. 30, 2020, the entire contents of which are hereby incorporated by reference.

TECHNICAL FIELD

The present disclosure is directed to a digital make-up artist and a method for interactive makeup advice and makeup tutorial.

BACKGROUND

Mobile applications, or Apps, have recently been developed that provide assistance in searching for and selecting cosmetic products for purchase. The Apps may provide tools for searching for particular types of make-up, or searching for a product that may be a user's favorite or just purchasing a previously used product. Some Apps provide assistance in choosing colors of lipstick or eyeshadow by displaying color palettes. Some Apps provide color matching features to assist in searching for a color that matches clothing, an accessory, or a color from a picture. Also, videos are available on how to apply certain types of make-up.

Some Apps make use of the cameras in smartphones, tablets, and laptops by offering product try-on applications. Some of these applications are implemented as Web applications, or an App. Some of these applications involve use of the camera for taking a self portrait photo with the smartphone camera, uploading the photo to the Web application, then applying virtual makeup products to the uploaded image. These applications may offer a variety of options, such as smoothing skin, lifting cheekbones, adjusting eye color. These applications may provide the user with the ability to add any type and color of makeup, as well as change the color intensity.

However, try-on applications offered thus far create a look by way of photo editing tools. Some of the prior try-on applications start with an uploaded photograph and provide one step functions to overlay makeup types and colors, then allow editing of the made-up photo. In addition, photo editing tools for mobile devices with cameras have become popular for use with social media. One photo-sharing app, VSCO, allows users to edit and add filters to photos before sharing them. Many VSCO filters are available for obtaining certain effects. A VSCO filter may consist of values that can be applied to a photo, including exposure, temperature, contrast, fade, saturation, tint, skintone. Although such photo editing tools offer functions to edit the photo, editing a photo does not provide a personal makeup experience. Also, prior try-on application tools do not provide for creation of custom looks. For example, a user may want a date night look. The prior try-on applications may offer a date night look, but do not provide advice on what makeup products to use that may be best for the user and how the various types of makeup products may be applied to create the look. Instead, some editing may be performed by the user on a face image in an attempt to obtain a custom look. Also, a user may want a date night look that is based on the user's mood, or a mood that the user may want to portray.

These prior try-on web applications or Apps lack full personalization partly because they perform a process that is not a customized makeup routine. A typical prior virtual try-on application process relies on templates and looks that were created for others. When a user wants a certain look that they have in mind, or wants to experiment with a new look, the user may be faced with having to edit a look created for someone else. There is a need to provide a custom try-on experience for a particular user that allows interaction in a manner that is comparable to the experience that the user may have with a personal makeup artist. There is a need for a makeup experience in which the personal makeup artist teaches a user the steps to get a desired look on their own face.

Social media apps have been developed to assist users in creating a cartoon avatar of themselves. These cartoon avatars can be customized with hairstyle, hair color, face shape and color, makeup, eyebrows, nose shape, etc. However, a user may wish to post on social media a madeup image of their actual face.

The aformentioned "background" description is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

An aspect is a digital makeup artist system, that includes a mobile device having a display device, computation circuitry, and a memory; a database system storing cosmetic routine information, common makeup looks, cosmetic products for skin types and ethnicity, and user look preferences of a user; a machine learning system for analyzing an image of a face; and the mobile device includes a user interface for interacting with a digital makeup artist, wherein the digital makeup artist performs an interactive dialog with the user in order to capture needs of the user, including one or more of type of makeup look, indoor or outdoor look, skin condition, facial problem areas, favorite facial features. The computation circuitry is configured to input a face image of the user, analyze, via the machine learning system, the user's face image to identify face parts, analyze the face image to determine facial characteristics including one or more of skin tone, eye color, hair color, lip color, and skin texture, and generate image frames to be displayed on the display device in synchronization with the interaction with the digital makeup artist. The image frames are generated based on the analyzed face image of the user, the needs of the user obtained through the interactions with the user, one or more of the stored cosmetic routine information, common makeup looks, cosmetic products for skin types and ethnicity, and the user look preferences.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 11 illustrates a non-limiting look-feature matrix in accordance with an exemplary aspect of the disclosure;

Figure 1:
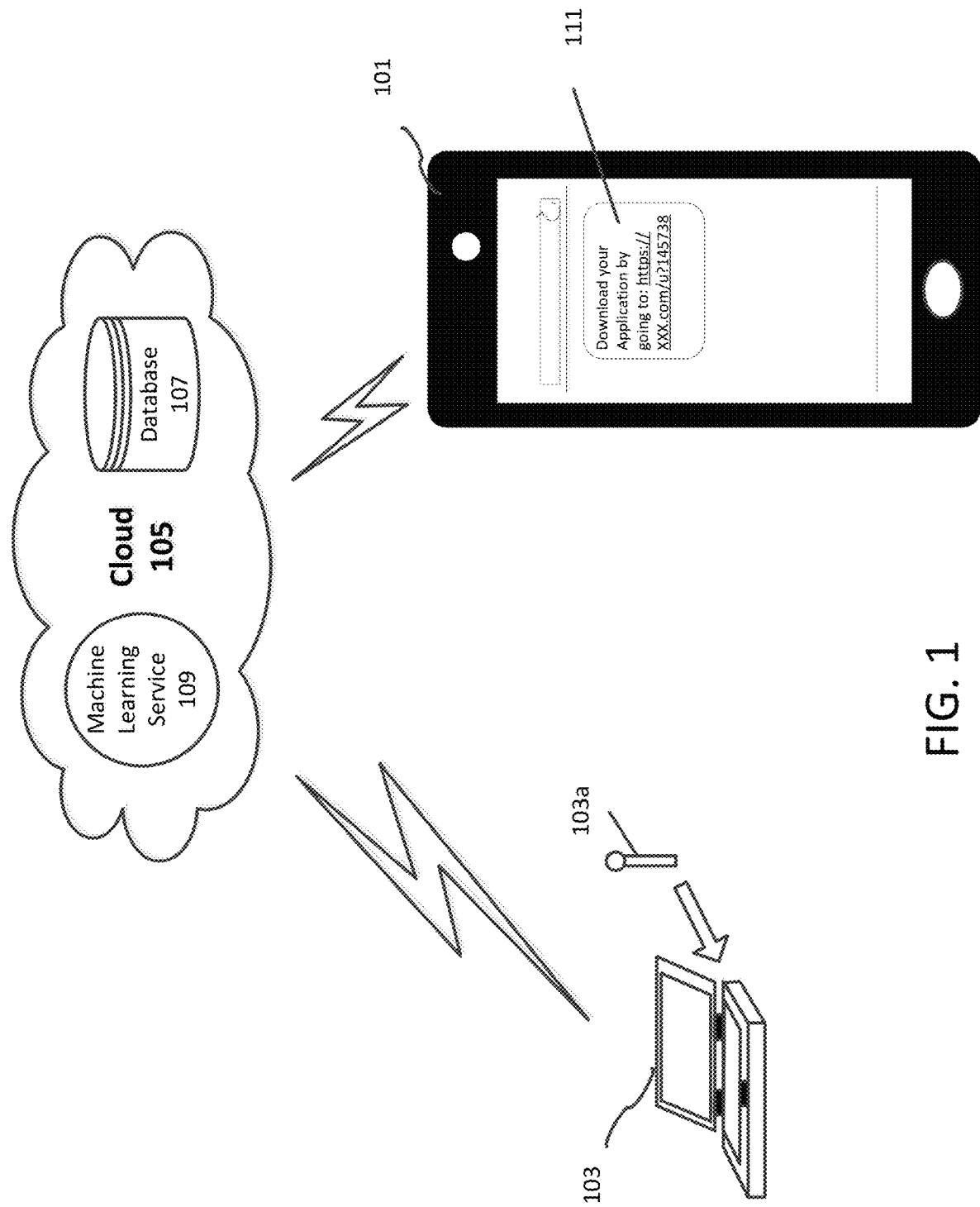
FIG. 1 is a diagram of a system in accordance with an exemplary aspect of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

DETAILED DESCRIPTION

Aspects of this disclosure are directed to a digital makeup artist that may be consulted for makeup advice and tutorials in a manner that is comparable to the experience that the user may have with a personal makeup artist. The disclosed digital makeup artist provides a makeup experience that teaches a user the steps to get a desired look on their own face.

FIG. 1 is a diagram of a system in accordance with an exemplary aspect of the disclosure. Embodiments include a software application, or mobile application (App). For purposes of this disclosure, herein below the term mobile application (App) will be used interchangeably with the software application, and makeup application will be used in reference to the process of applying makeup, either virtually or physically. The software application may be executed on a desktop computer or laptop computer 103. The mobile application may be executed on a tablet computer or other mobile device 101. For purposes of this disclosure, the software application and mobile application are described in terms of the mobile application 111. In each case, the mobile application 111 may be downloaded and installed on a respective device 101, 103. In some embodiments, the desktop computer or laptop computer 103 may be configured with a microphone 103a as an audio input device. The microphone 103a may be a device that connects to a desktop computer or laptop computer 103 via a USB port or audio input port, or wireless via a Bluetooth wireless protocol. The mobile device 101 may be equipped with a built-in microphone. In some embodiments, the software application or mobile application may include a communication function to operate in conjunction with a cloud service 105. The cloud service 105 may include a database management service 107 and a machine learning service 109. The database management service 107 may be any of the types of database management systems provided in the cloud service 105, for example, the database management service 107 may include a database that is accessed using a structured query language (SQL), or a unstructured database that is accessed by keys, commonly referred to as No SQL. The machine learning service 109 may perform machine learning in order to allow for scaling up and high performance computing that may be necessary for the machine learning. Also, the software application or mobile application may be downloaded from a cloud service 105. Although FIG. 1 shows a single cloud service, laptop computer and mobile device, it should be understood that any number of mobile devices, laptop computers, as well as desktop computers and tablet computers, may be connected to one or more cloud services.

Figure 2:
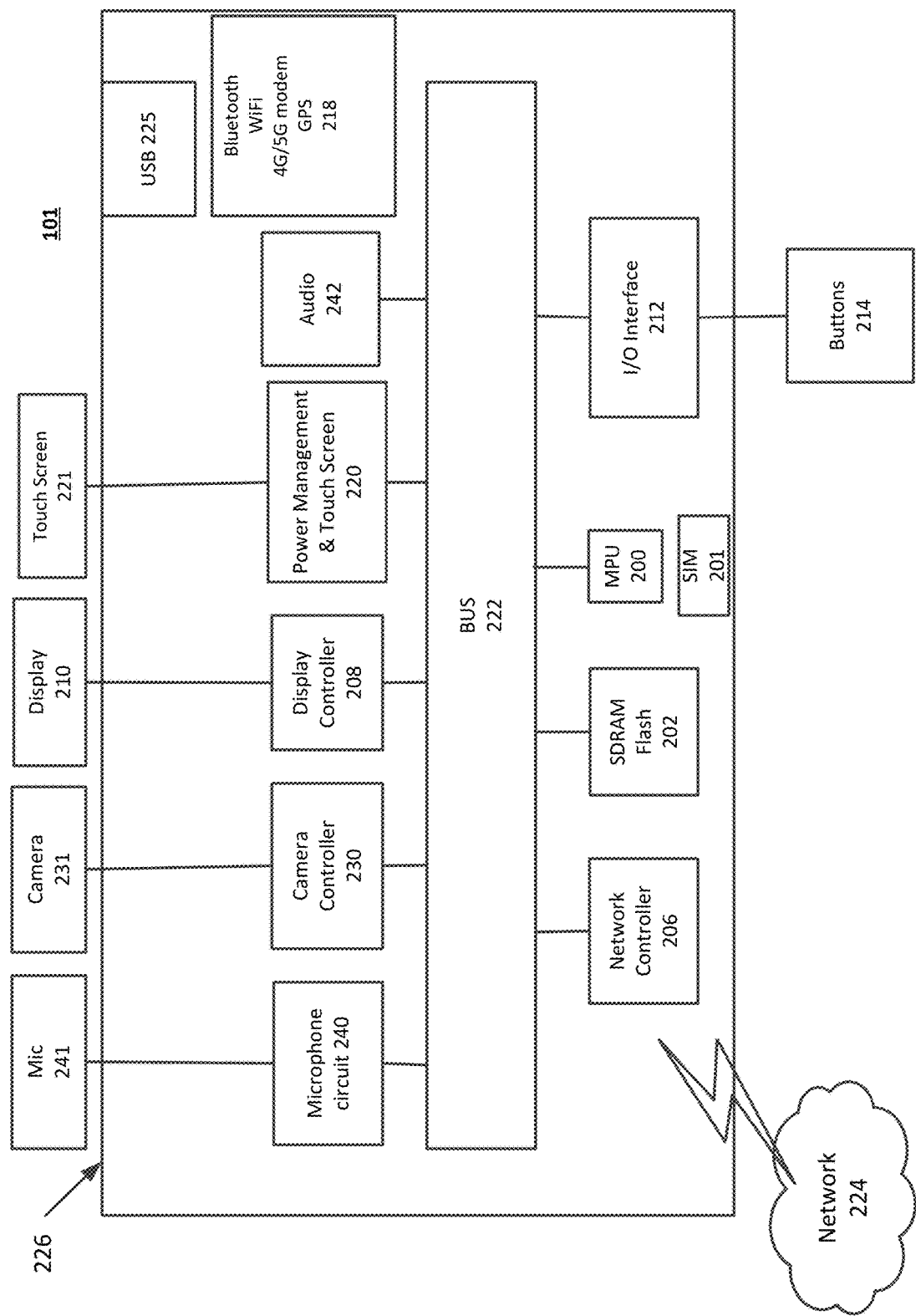
FIG. 2 is a block diagram of a computer system for a mobile device.

FIG. 2 is a block diagram of a mobile computer device. In one implementation, the functions and processes of the mobile device 101 may be implemented by one or more respective processing/computation circuits 226. The same or similar processing/computation circuits 226 may be applied to a tablet computer or a laptop computer. A processing circuit includes a programmed processor as a processor includes circuitry. A processing circuit may also include devices such as an application specific integrated circuit (ASIC) and conventional circuit components arranged to perform the recited functions. Note that circuitry refers to a circuit or system of circuits. Herein, the circuitry may be in one computer system or may be distributed throughout a network of computer systems.

Next, a hardware description of the processing/computation circuit 226 according to exemplary embodiments is described with reference to FIG. 2. In FIG. 2, the processing/computation circuit 226 includes a Mobile Processing Unit (MPU) 200 which performs the processes described herein. The process data and instructions may be stored in memory 202. These processes and instructions may also be stored on a portable storage medium or may be stored remotely. The processing/computation circuit 226 may have a replaceable Subscriber Identity Module (SIM) 201 that contains information that is unique to the network service of the mobile device 101.

Further, the claimed advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing/computation circuit 226 communicates, such as a server or computer.

Further, the claimed advancements may be provided as a utility application, background daemon, or component of an operating system, or combination thereof, executing in conjunction with MPU 200 and an operating system. The operating system may be for a laptop computer or a desktop computer such as Mac OS, Windows 10, or a Unix operating system. In the case of a mobile device such as a smartphone or tablet computer, a mobile operating system such as Android, Microsoft® Windows® 10 Mobile, Apple iOS® and other systems known to those skilled in the art may be used.

In order to achieve the processing/computation circuit 226, the hardware elements may be realized by various circuitry elements, known to those skilled in the art. For example, MPU 200 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 200 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 200 may be implemented as multiple processors cooperatively working in parallel to perform the instructions of the inventive processes described above.

The processing/computation circuit 226 in FIG. 2 also includes a network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network. The processing circuit may include various types of communications processors for wireless communications including 3G, 4G and 5G wireless modems, WiFi®, Bluetooth®, GPS, or any other wireless form of communication that is known.

The processing/computation circuit 226 includes a Universal Serial Bus (USB) controller 225 which may be managed by the MPU 200.

The processing/computation circuit 226 further includes a display controller 208, such as a NVIDIA® GeForce® GTX or Quadro® graphics adaptor from NVIDIA Corporation of America for interfacing with display 210. An I/O interface 212 interfaces with buttons 214, such as for volume control. In addition to the I/O interface 212 and the display 210, the processing/computation circuit 226 may further include a microphone 241 and one or more cameras 231. The microphone 241 may have associated circuitry 240 for processing the sound into digital signals. Similarly, the camera 231 may include a camera controller 230 for controlling image capture operation of the camera 231. In an exemplary aspect, the camera 231 may include a Charge Coupled Device (CCD). The processing/computation circuit 226 may include an audio circuit 242 for generating sound output signals, and may include an optional sound output port.

The power management and touch screen controller 220 manages power used by the processing/computation circuit 226 and touch control. The communication bus 222, which may be an Industry Standard Architecture (ISA), Extended Industry Standard Architecture (EISA), Video Electronics Standards Association (VESA), Peripheral Component Interface (PCI), or similar, for interconnecting all of the components of the processing/computation circuit 226. A description of the general features and functionality of the display 210, buttons 214, as well as the display controller 208, power management controller 220, network controller 206, and I/O interface 212 is omitted herein for brevity as these features are known.

Figure 3:
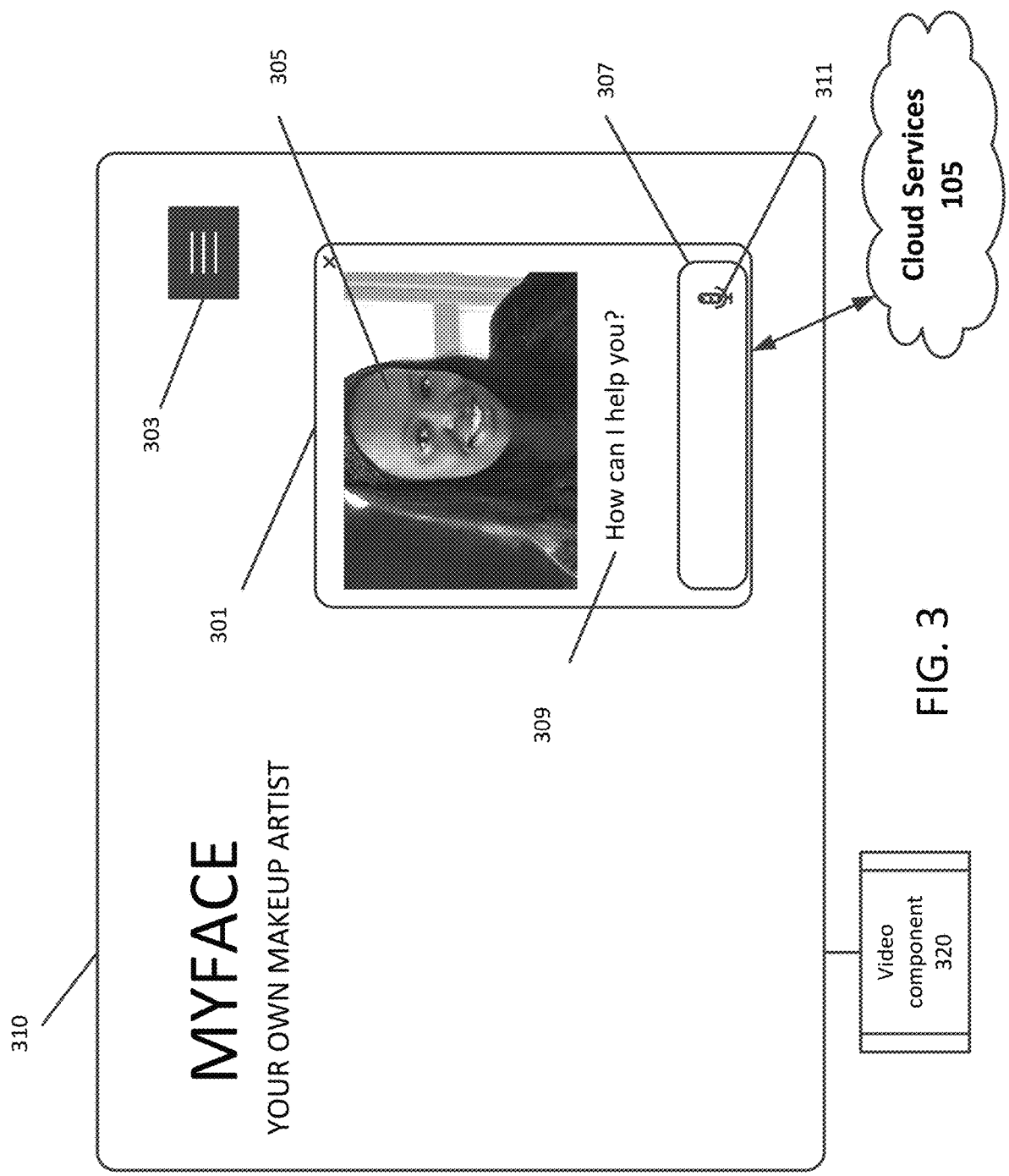
FIG. 3 illustrates a user interface screen having an avatar in accordance with an exemplary aspect of the disclosure.

FIG. 3 illustrates a user interface screen having an avatar in accordance with an exemplary aspect of the disclosure. For purposes of this disclosure, the disclosed avatar is a graphical representation of a digital makeup artist, but may also be a picture of a makeup artist 305, and may represent a person which can communicate with a user using speech or text. Speech input can be activated by selecting an icon 311 representing a microphone. A subscreen 301 containing the avatar or picture 305 may provide an area for interacting. The avatar or picture 305 can output speech to the computer's audio output 242, or an external speaker connected to the computer 101. The avatar or picture 305 can output text 309. The subscreen may include an input box 307 where a user can type in text. In some embodiments, when a user speaks into the microphone 241, the speech is translated into text, and the text is displayed in the input box 307. The subscreen 301 may be contained in a user interface window 310. The window 310 may be a graphical object that is controlled by the operating system of the computer system 103. The window 310 may display a browser window or a window of a software application or a mobile application. The window 310 may include a menu icon 303 which when selected may display a menu of items that may be selected and perform specified functions.

The avatar 305 may be implemented as a software object that performs animations. In some embodiments, as described further below, the avatar 305 may be synchronized with a video played in a video component 320. Control of the video component 320 may be performed by spoken commands that are made using the microphone 241 when the microphone icon 311 is activated. The avatar 305 may respond to speech input by performing natural language processing on the input and outputting a speech response through an audio output 242. In order to synchronize the avatar with the video, the avatar 305 may forward messages to the video component 320, and the video component 320 may share information, such as timing information, with the avatar 305. A video played by the video component 320 may be broken up into chapters. A chapter may be identified by a chapter name and time. The time may be in seconds from the beginning of the video, or in terms of a percentage of the full length of the video. In some embodiments, the video is a sequence of makeup application steps in which frames of the video are generated based on an image of a user's face and makeup to be applied. For purposes of this disclosure, a makeup application step may include application of a certain type of makeup to a certain part of a user's face image. A certain type of makeup may include a particular makeup product, and particular characteristics of the makeup product.

In some embodiments, the avatar 305 is implemented as a conversational agent, which may ask questions and provide solutions with respect to the questions. The conversational agent may also respond to certain types of questions asked by the user. The conversational agent may respond to statements by the user that are responses to questions that the conversational agent had asked. The conversational agent stores state information in the cloud service 105. In some implementations, the conversational agent may have been previously created using a software tool, such as the Bot Framework SDK available for the Microsoft Azure cloud service. The operation of the conversational agent will become more apparent in the description below.

Figure 4:
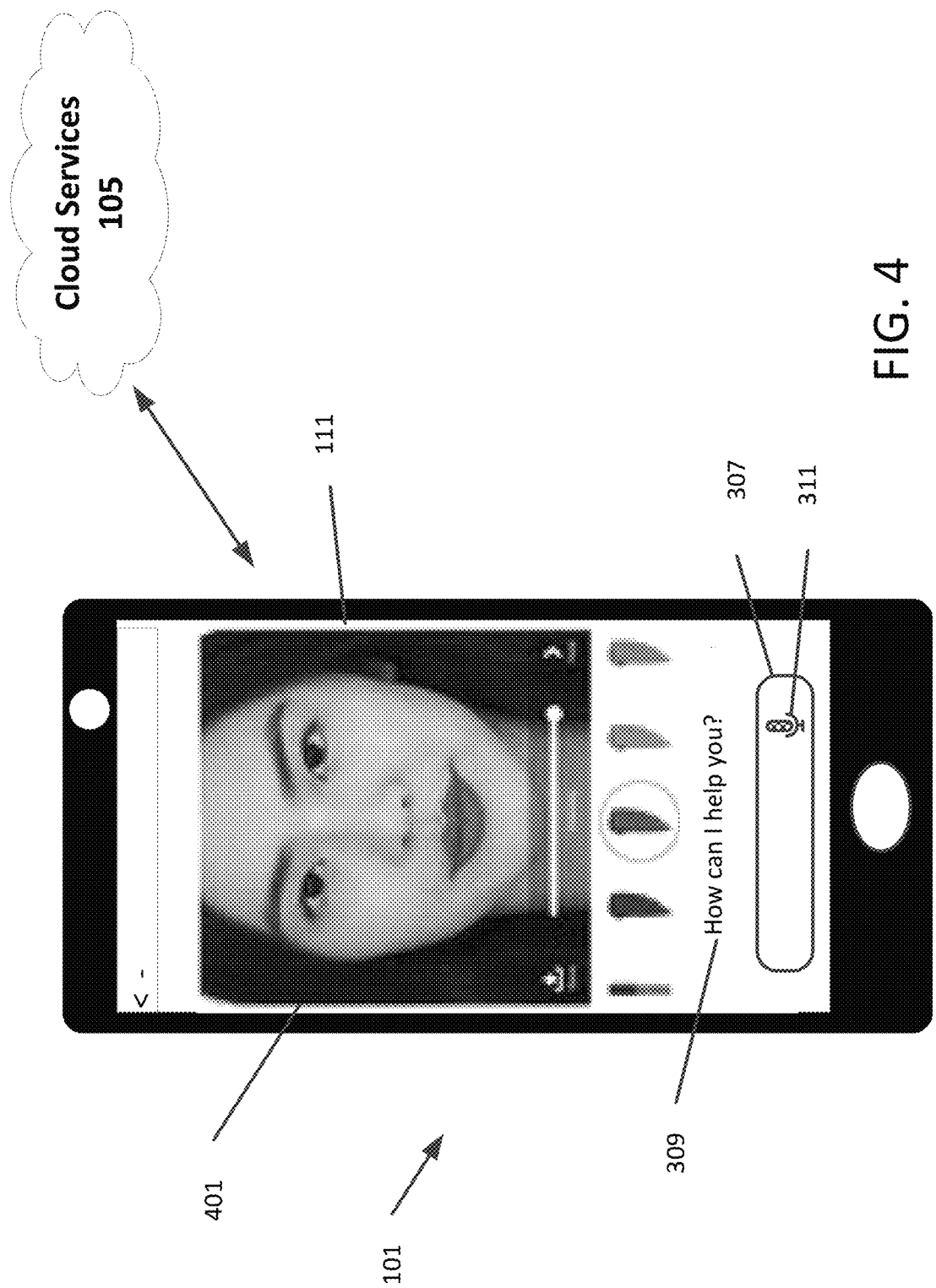
FIG. 4 illustrates a user interface screen for a mobile device in accordance with an exemplary aspect of the disclosure.

FIG. 4 illustrates a user interface screen for a mobile device in accordance with an exemplary aspect of the disclosure. In some embodiments, a user interface is provided for smaller screens, such as the screen in a smartphone 101. Provided the smaller screen, interaction with the avatar 305 may be through audio and/or text. Speech input can be activated by selecting an icon 311 representing a microphone. A section of the display screen 210 may display controls and text associated with conducting a dialog. The avatar 305 can output speech to the computer's audio output 242, or an external speaker connected to the computer 101. The avatar 305 can output text 309 to the display 210. The section of the display screen 210 may include an input box 307 where a user can type in text. In some embodiments, when a user speaks into the microphone 241, the speech is translated into text, and the text is displayed in the input box 307. The display screen 210 may also display an image or video 401 of the user's face.

Figure 5:
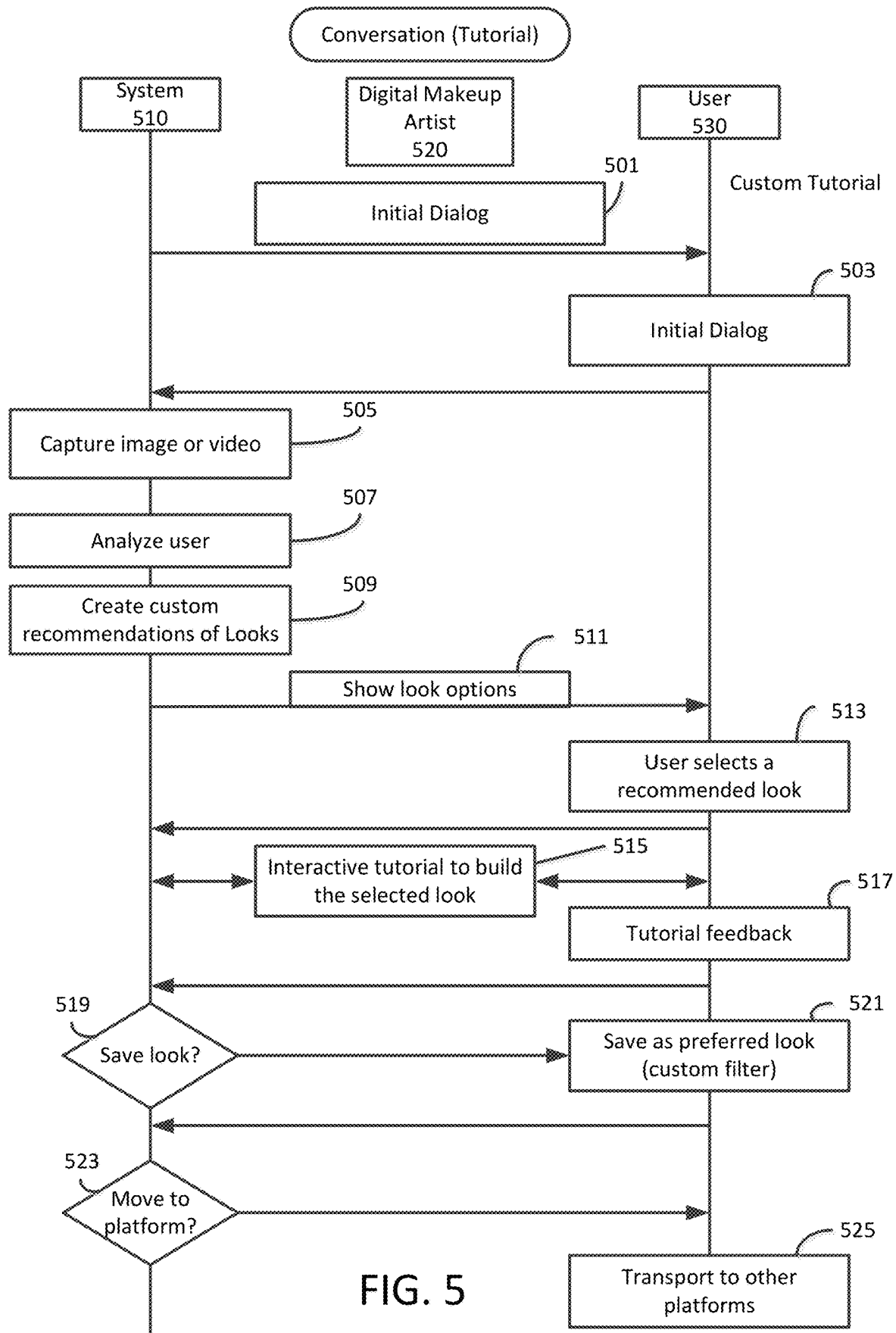
FIG. 5 is a sequence diagram for interaction between a digital makeup artist and a user for a custom tutorial in accordance with an exemplary aspect of the disclosure.

FIG. 5 is a sequence diagram for interaction between a user and a digital makeup artist for a custom tutorial in accordance with an exemplary aspect of the disclosure. The digital makeup artist 520 may take the form of the avatar 305 or may be conversational agent that is interacted with through speech. The digital makeup artist 520 may be performed by a mobile application 111 and may represent a fictional person or an actual makeup artist. A system 510 may be a desktop computer, laptop computer 103, tablet computer, mobile device 101, or other computer system having a display function. The system 510 may be a combination of any of a desktop computer, laptop computer, tablet computer, or mobile device, and a cloud service 105. The system may have an audio function. A user input 530 may in the form of a text input area and/or a microphone input.

Conventional videos of tutorials for applying makeup include basic video functions of Play, Pause, Stop, and may include a time slider for moving the start time of video playback while the video is paused. In disclosed embodiments, the Digital Makeup Artist 520 is used to provide interaction with a custom tutorial.

A user may use the mobile application 111 for a purpose such as a use case in which the user has a look in mind, but would like to have the Digital Makeup Artist show how the look may be created. The mobile application 111 may perform a custom tutorial to create the look. In 501, a Digital Makeup Artist 520 of the mobile application 111 may perform an initial dialog with a User 530 in order to obtain some information about the user and particularly, the User's needs. The Digital Makeup Artist 520 may begin a dialog by displaying and/or speaking an initial question, such as: "What type of look do you want to create?"

Figure 6:
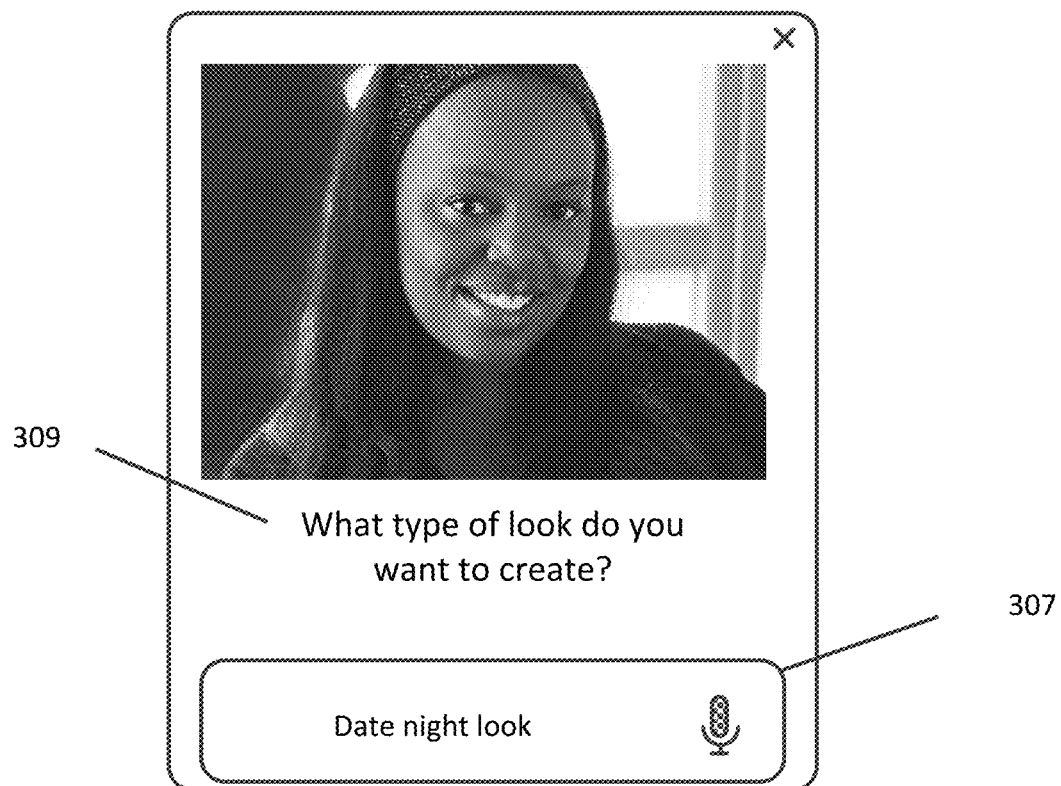
FIG. 6 is a user interface for inputting a type of look in accordance with an exemplary aspect of the disclosure.

In 503, the user may state a desired type of look. The user's statement may be entered as text in input block 307. Alternatively, the user may choose to interact with the Digital Makeup Artist 520 through voice by selecting the microphone icon 311. The system 510 may extract keywords from the user's statement to be used to select a pre-stored look from the database 107. FIG. 6 is a user interface for inputting a user description of a type of look.

The user interface may provide a list of various types of looks. Examples of types of looks may include season looks (spring, summer, fall), event looks (Date night, Dinner with Girlfriends, special date, going out with mother-in-law, holiday, party, new year's eve, Bridal, Prom), looks based on time to complete (quick makeup, average makeup, take-your-time makeup), mood looks (cheery, happy, notice-me), styles (natural, evening, glam, gothic, work, beach), aesthetic looks (VSOC, eGirl, soft girl) to name a few.

The Digital Makeup Artist 520 may further display and/or speak a question, such as: "What is your level of experience in doing makeup?" to obtain information about the User's level of experience. The user may be provided with a list of experience levels to select from, or may input via voice an experience level. In one or more embodiments, information about a User 530, including level of experience may be found in a stored User Profile.

A level of experience may include novice/beginner look, experienced level, expert level, professional. The novice/beginner level may be a user that has little or no experience in applying makeup. The experienced level may be a user that has previously applied makeup, and thus has some experience. The expert level may be a user that has been applying makeup for a while, such as a year or more, as well as has taken steps to learn how to properly apply makeup. The professional level may be a user that applies to others.

The Digital Makeup Artist 520 may further display and/or speak a question, such as: "Is your makeup look primarily for indoor or outdoor wear?" in order to improve the type of makeup that may be recommended.

The Digital Makeup Artist 520 may further display and/or speak a question, such as: "Is your skin dry?" in order to obtain information about the User's skin condition that may be difficult to obtain through image processing techniques. Other questions may relate to obtaining information on facial problem areas and favorite facial areas that the user may want to be considered.

The Digital Makeup Artist 520 can perform a custom tutorial to teach steps to create the user's desired look. The Digital Makeup Artist 520 may teach the steps using the user's own face and the steps may apply makeup in a manner that creates a look that is at it would appear when applied to the user's face. In 505, the camera 231 can be used to capture an image or video of the user's face. The user may view the captured image or video on the display screen 210.

In 507, the image or video may be analyzed by the system 510 in order to obtain information of the user's face. For example, the image may be analyzed to identify the face contained in the image, determine the face shape, determine the parts of the face, and other characteristics that may be used to provide guidance during the tutorial. Conventional image processing algorithms have been used to identify features in an image, such as image segmentation, brightness level, average color. However, in the case of face recognition, artificial neural networks have recently been developed. Some artificial neural networks for face recognition are based on the structure of the human visual cortex. Architectures for artificial neural networks for computer vision continue to improve. For purposes of this disclosure, two non-limiting artificial neural networks are described that may be used to analyze the captured image or video.

In some embodiments, one or both of the artificial neural networks may be performed by the mobile device 101 or laptop computer 103 provided there are sufficient computer resources to perform processing of the artificial neural networks. In some embodiments, one or both of the artificial neural networks may be performed by a machine learning service 109 in a cloud service 105. In some embodiments, the artificial neural networks may be trained in the machine learning service 109, and the trained artificial neural networks may be performed in the mobile device 101 or laptop computer 103.

In order to perform face recognition, the mobile application 111 may perform image processing operations in order to improve image features, such as to improve lighting. For instance, a user may inadvertently take a self-picture when bright light or sunshine is from a direction behind the user. The mobile application 111 may brighten the face image of the user. Other image processing operations may be performed to improve the image quality.

Figure 7:
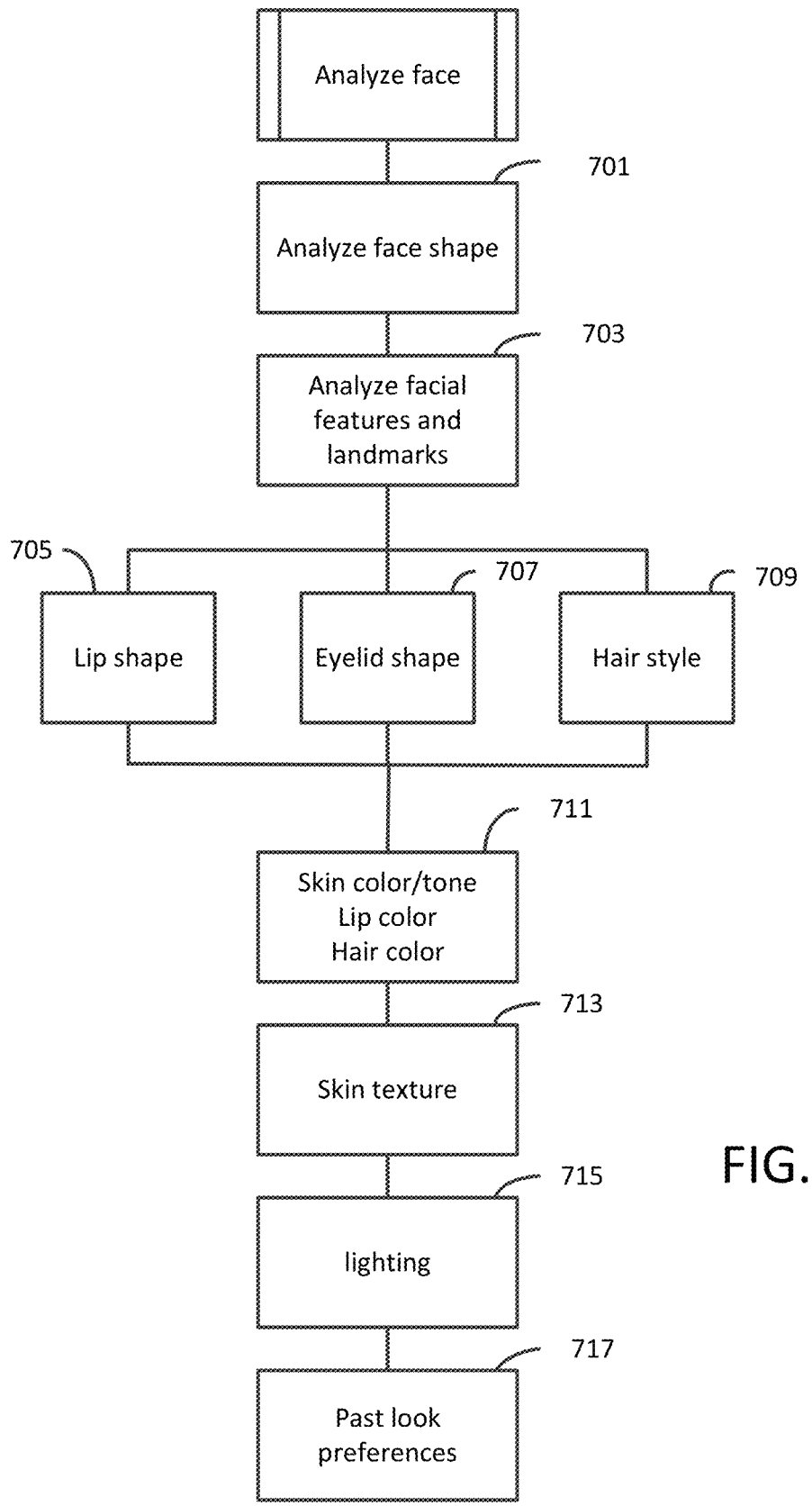
FIG. 7 is a flowchart of face analysis in accordance with an exemplary aspect of the disclosure.

FIG. 7 is a flowchart of the face analysis step in more detail.

In 701, an analysis may be performed on the captured image to determine a face shape. A machine learning model may be used to detect the face shape of the captured face of the user. The machine learning model may be trained to classify face shape using face images with known face shapes. Recently image classification has been performed using an artificial neural network that is inspired by how the visual cortex of human brain works when recognizing objects. This image classification artificial neural network is a family of models known as convolution neural networks (CNN). There are other approaches that have been proposed for image classification which continue to improve. These other approaches for image classification that may be used for image classification include linear regression, decision trees, and support vector machines, to name a few. As mentioned above, the machine learning model may be trained using the machine learning service 109 of the cloud service 105.

Figure 8:
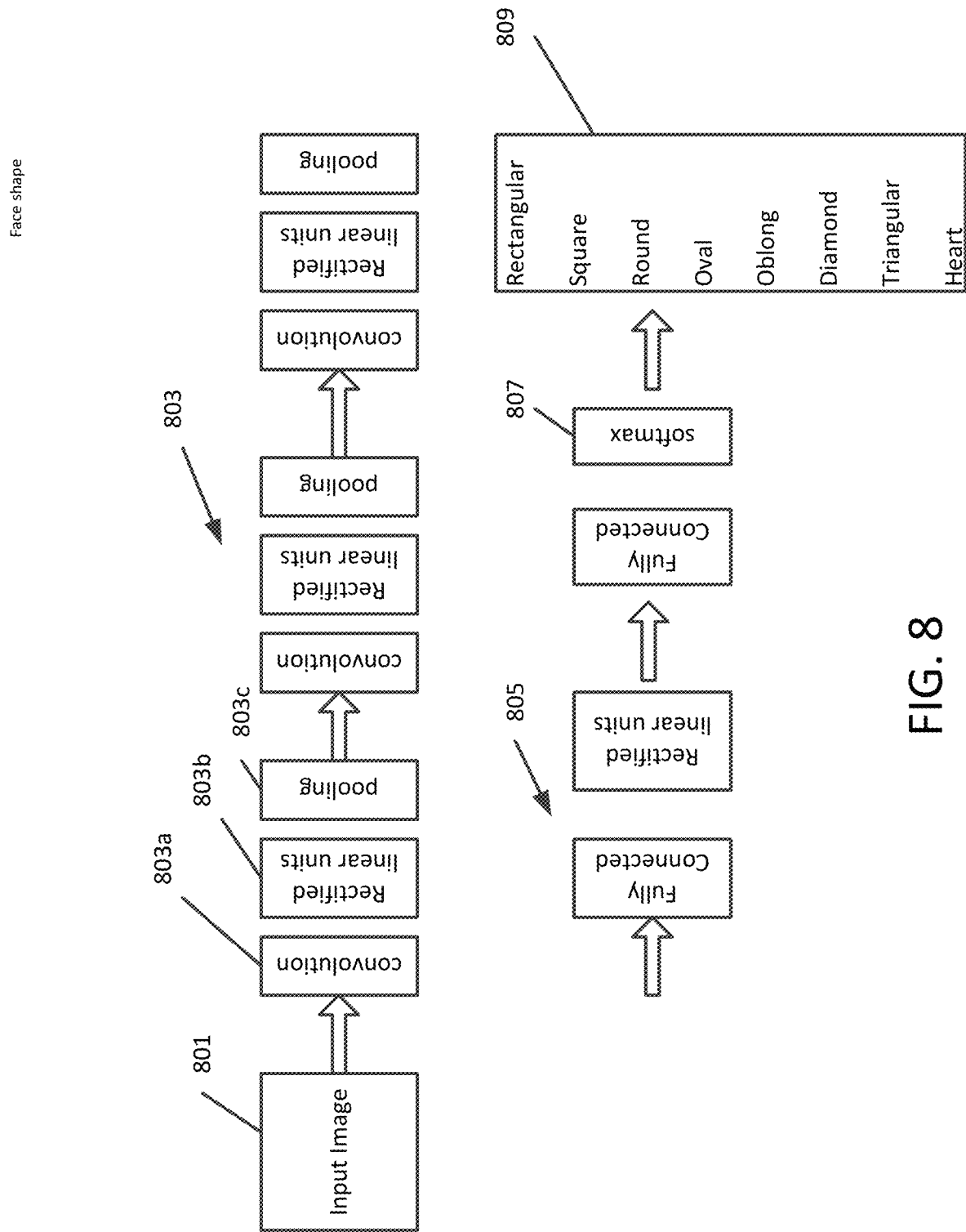
FIG. 8 is a diagram of an exemplary architecture for a convolution neural network for classification of face shape.

In disclosed embodiments, an architecture of a machine learning model that may be used to classify face shape is a CNN. FIG. 8 is a block diagram of a CNN for classifying face shape. Dimensions and activation functions of the CNN may be varied depending on available processing power and desired accuracy. The dimensions include the number of channels, the size of each layer and the number of layers. Activation functions include logistic, rectified linear unit, among others.

The convolution neural network (CNN) may be made up of several types of layers. A convolution component 803 may be made up of a convolution layer 803a, a pooling layer 803c, and a rectified linear unit layer 803b. The convolution layer 803a is for developing a 2-dimensional activation map that detects the special position of a feature at all the given spatial positions. The pooling layer 803c acts as a form of downsampling. The rectified linear unit layer 803b applies an activation function to increase the nonlinear properties of the decision function and of the overall network without affecting the receptive fields of the convolution layer itself. A fully connected layer 805 includes neurons that have connections to all the activations amongst the previous layers. A loss layer specifies how the network training penalizes the deviation between the predicted and true layers. The loss layer 807 detects a class in a set of mutually exclusive classes.

In some embodiments, the loss layer 807 may be a softmax function. The softmax function provides a probability for each class. In an exemplary embodiment, the classes 809 may include square, rectangular, round, oval, oblong, diamond, triangular, and heart face shapes.

In 703, the mobile application may analyze facial features and landmarks. Similar to face shape, the facial features and landmarks of the captured face of the user may be detected using a machine learning model. The machine learning model may be trained to detect facial landmarks. As with face shape classification, other approaches to classification may be used. Also, a CNN architecture similar to FIG. 8 may be used as well for face landmark detection.

Figure 9:
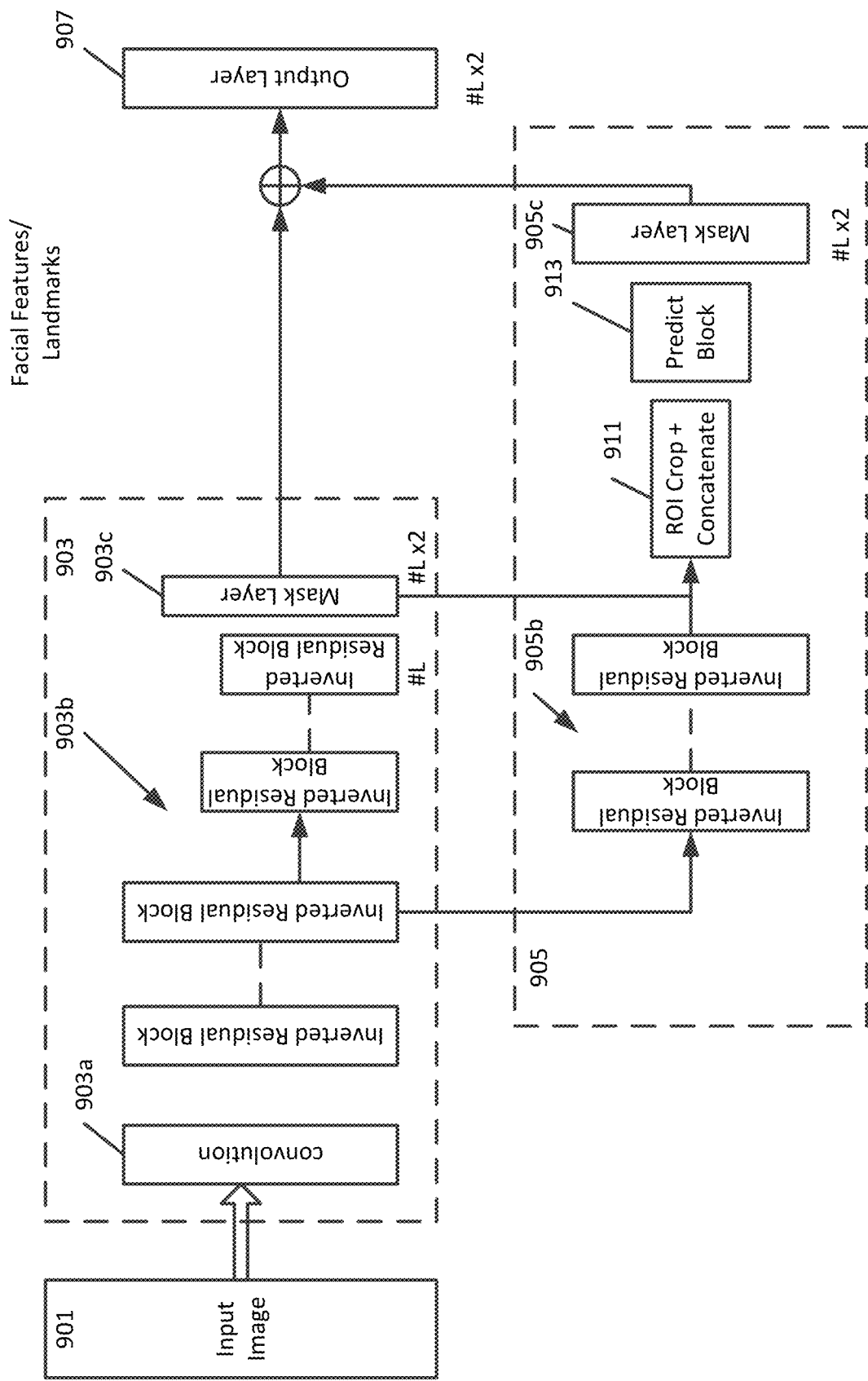
FIG. 9 is a diagram of an exemplary deep learning neural network for face landmark detection.

FIG. 9 is a diagram of a deep learning neural network for face landmark detection. Similar to the architecture in FIG. 8, the deep learning neural network is a convolution neural network. In order to improve training of the deep learning neural network, residual connections may be included. In one or more embodiments, inverted residual structures may be included in which residual connections are made to earlier layers in the network. Regarding the architecture in FIG. 9, the network is provided as two stages, 903 and 905. The first stage 903 is a convolution stage for performing feature extraction. The second stage 905 performs prediction in regions of interest.

The architecture of the first stage 903 includes a convolution section 903a that, provided an input face image 901, performs convolution and max pooling operations. The convolution section 903a is connected to an inverted residual structure 903b. A mask layer 903c is connected to the inverted residual structure 903b. The size of the mask layer 903c is based on the number of landmarks (e.g., 2×L, the number of landmarks). The mask layer 903c encodes the spatial layout of the input object.

The architecture of the second stage 905 includes an inverted residual structure 905b that is connected to the inverted residual structure 903b of the first stage 903. Also, the mask layer 903c of the first stage 903 is applied to the results of the inverted residual structure 905b and provided as input for performing region of interest cropping in ROI and Concatenate Block 911. The ROI and Concatenate Block 911 is based on the number of channels in the inverted residual structure 905b and the number of landmarks. A predict block 913 predicts landmarks and approximate locations in the mask layer 905c. The predictions for the regions of interest of the second stage 903 are combined with the landmarks estimated by mask 903c for the total image to obtain output landmarks in output layer 907.

In one or more embodiments, the landmarks for a face include eyes, nose, lips, cheekbones, areas around the eyes including eye brows, eye lids, as well as hair. In some embodiments, landmarks may include possible facial anomalies.

The specific dimensions of each layer and the number of layers may depend on parameters including the desired accuracy, hardware to perform the machine learning model, and the length of time to train the machine learning model. The machine learning model may be trained using the machine learning service 109 of the cloud service 105.

Analysis of facial features, 507, may further include detection of lip shape 705, eyelid shape 707, and hair style 709. The detected landmarks can be used to calculate contours of the lips, eyes, and hair style. In addition, other facial features such as skin color/tone, eye color, lip color, hair color 711 and skin texture 713 may also be determined from the face image. Skin color/tone and skin texture may be determined using image processing techniques. Skin color/tone can be analyzed to determine RGB coordinates and assigned a name of the skin color/tone. The analysis of skin color may reveal differences in skin tone. Types of skin tone may include fair, light, medium or deep. In a similar manner, eye color, lip color and hair color may be determined using image processing techniques. Skin texture may be analyzed using an analysis of variations in brightness.

An additional feature of a facial image may be lighting (image brightness). In 715, image lighting (brightness) may also be determined using image processing techniques. Brightness may be defined as a measure of the total amount of perceived light in an image. In some embodiments, brightness of an image may be increased or decreased from its initial as captured brightness level.

In 717, past look preferences may be retrieved from a database 107. Past look preferences can include characteristics of a makeup product, including coverage, shade, finish of a color that was used for a past look. Past user preferences may include makeup product characteristics for a particular part of the face, and can also include a choice of makeup product that was applied for a particular look, in particular, a particular part of the face.

In 509, one or more makeup filters may be selected/retrieved from the database 107 based on the facial features (parts of a face) and past look preferences determined by the face analysis (507 and FIG. 7). Some stored makeup face filters may be filters that have been previously created through the generation of a custom look during a custom tutorial or makeup consultation with a digital makeup artist 520.

A makeup filter is a feature mask that may be blended with a base frame, i.e., an image having a front view of a user's face. The feature mask is blended with the base frame to produce an image with a resulting face image having modified features. The App may make adjustments to the feature mask in order to line up with features of the face in the base frame using location of boundaries of facial features determined using face analysis 507. The feature mask consists of RGB pixel values.

Figure 10:
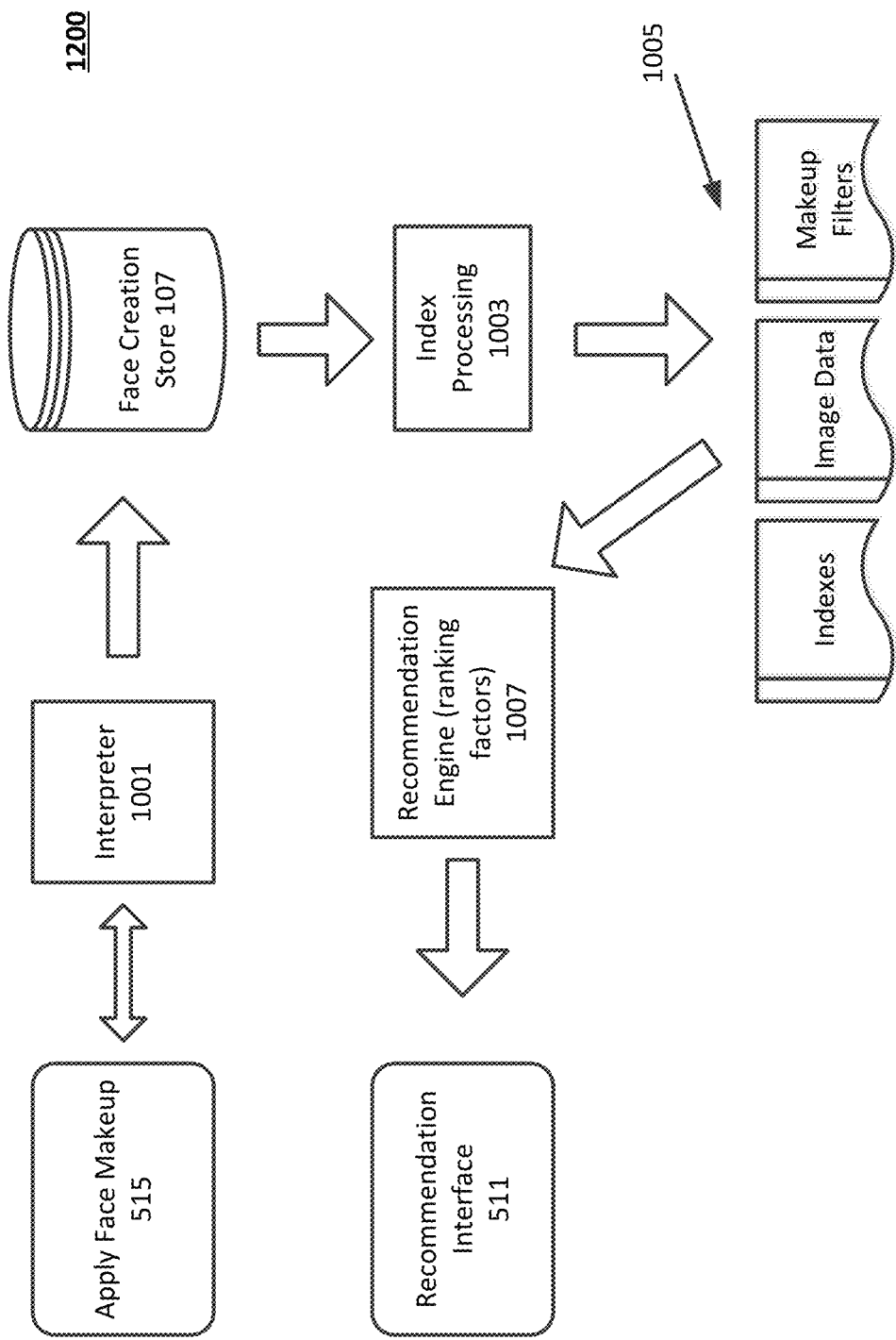
FIG. 10 is a diagram for a recommender system in accordance with an exemplary aspect of the disclosure.

The one or more makeup filters may be retrieved from the database 107 using a recommender system. FIG. 10 is a diagram for a recommender system. The recommender system 1000 may be used for retrieving makeup filters to be used in showing how to apply a virtual makeup (515 in FIG. 5). The recommender system 1000 works off of an indexed database 1005 of image data and makeup filters which may be stored in database 107.

The indexed database 1005 may also include answers to common questions about makeup, common makeup looks, makeup products for particular skin types (skin tone, skin dryness, skin texture) and/or particular ethnicity of a person. The indexed database 1005 may be populated with makeup information extracted from external databases or Web sites, such as product review information including ratings and public comments.

The indexed database 1005 may further include categories of cosmetic products, including a category of makeup that provides a combination of functions such as appearance and skin care. Makeup products in this category may include a foundation that has anti-aging qualities or sun protection, and makeup products blended with medications, or other skin treatment products. Another category may be skin care products for skin care routines to be used before applying makeup.

The recommender system 1000 includes a recommendation engine 1007 that retrieves and ranks recommended makeup filters. In the case of application of a particular virtual makeup, a recommended makeup filter may be for the look that the user has input in step 501 and the virtual makeup. In some embodiments, the recommended makeup filter may be retrieved based on user preferences or favorites. Personal user preferences may be makeup characteristics that a user has entered when the App is first set up. Personal user preferences may be one or more makeup filters that had previously been built during a custom tutorial or consultation with the digital makeup artist 520. Favorites may be makeup characteristics that a user has flagged as being a favorite. Personal user preferences and favorites may be for particular parts of a face or for the entire face.

In one or more embodiments, the recommendation engine 1007 may use a look-feature matrix. FIG. 11 illustrates a non-limiting look-feature matrix in accordance with an exemplary aspect of the disclosure. The look-feature matrix illustrated in FIG. 11 is a partial matrix showing two types of virtual makeup for the sake of brevity. Other types of virtual makeup may be included in the look-feature matrix, including, but not limited to, foundation, mascara, concealer, cheek powder, eyebrow pencil, to name a few. The look-feature matrix may be stored in the App in the mobile device to be compared to a vector of desired features. The desired features may be a vector of current user preferences and may take into account the user's current experience level and a desired look (501). The recommendation engine 1007 may use one or more similarity metrics and a scoring algorithm to rank recommendations. In an embodiment, the recommendation engine 1007 may generate a set of features that elevate recommendations in order to encourage creativity by changing certain characteristics for a virtual makeup from those that are recommended. For example, if the recommendation engine 1007 ranks a recommendation high among retrieved recommendations, it may then change one or more characteristics in order to increase a similarity score. Alternatively, the recommendation engine 1007 may change one or more characteristics in a retrieved recommendation, such as shade or finish, to one up or one down (e.g., change a shade to one level up or one level down from the stored shade). In one of more embodiments, the recommendation engine 1007 may adjust the application gesture to be more or less precise based on the experience level of the user.

In one or more embodiments, the recommendation engine 1007 may be implemented by or supplemented with a machine learning model. A machine learning model may be trained for choosing a shade of foundation that is appropriate for a particular skin undertone, skin type and/or ethnicity. A machine learning model may be trained for choosing a shade of lipstick based on the lip color of the User. A machine learning model may be trained for choosing a shade of eye shadow based on the eye color of a user and skin undertone.

A machine learning model for the recommender engine 1007 may be trained using data in the indexed database 1005, as well as using data from external databases, especially those external databases having images and videos that a User may publish their custom looks. Example external databases include databases for social media platforms such as Facebook, Instagram, Snapchat, TikTok, that may be publically available, and video conferencing platforms such as Zoom, Microsoft Teams, Google Hangouts or Google Meet, to name a few.

The machine learning model for the recommender engine 1007 may be based on algorithms for relatively small data sets, including decision trees, random forests, or single layer neural networks—perceptron. Provided large data sets consisting of thousands of training data examples, a deep learning neural network may be used as the machine learning model. The architecture for the deep learning neural network may be a variation of a convolution neural network for recognizing features in color images.

The recommendation engine 1007 may output one or more recommendations to a recommendation user interface (511). The recommendation user interface may also display a sequence of video frames that demonstrate application of a selected recommendation.

In 511, one or more look options may be displayed on the display screen 210.

Figure 12:
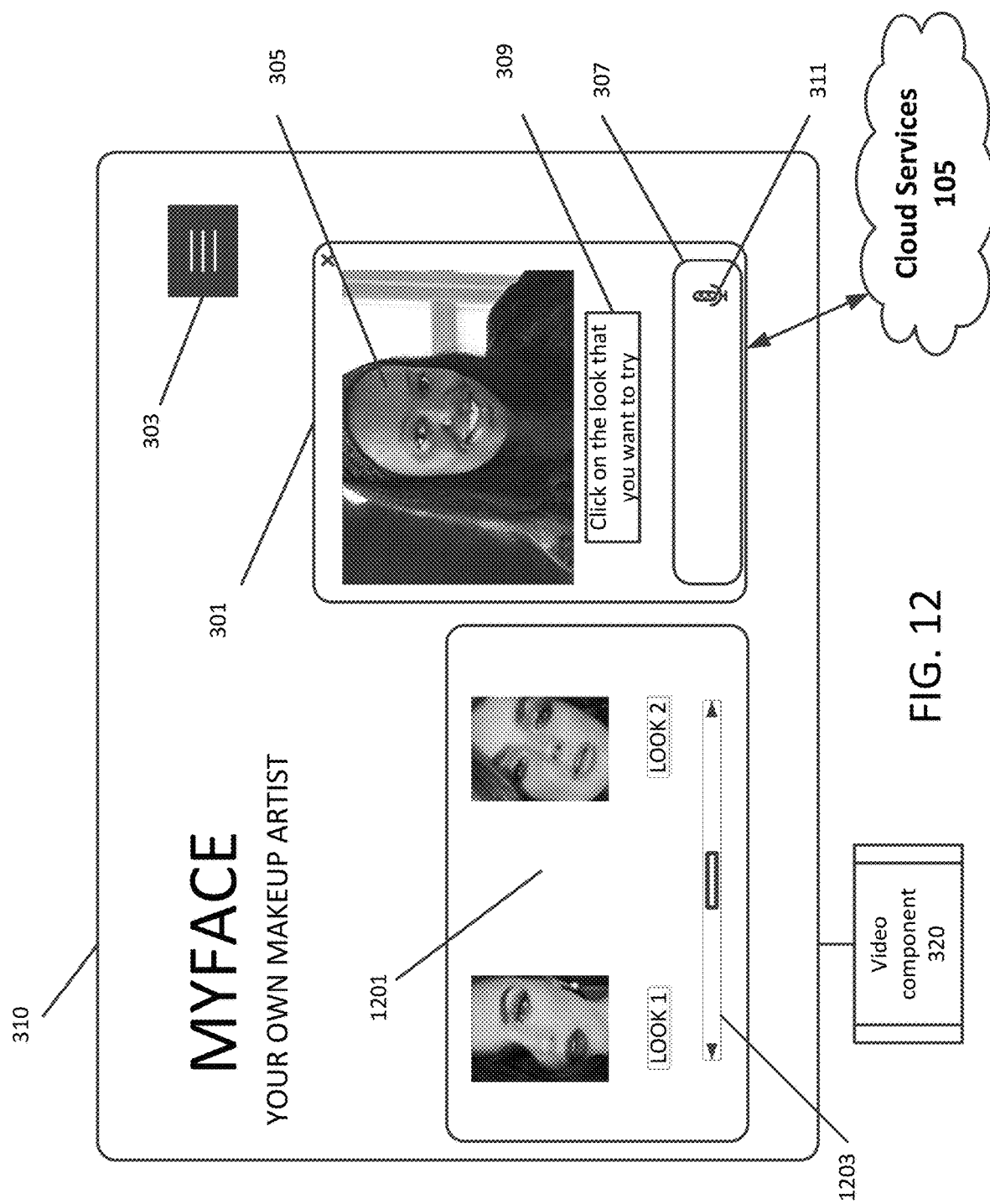
FIG. 12 is a user interface in a mobile application in accordance with an exemplary aspect of the disclosure.

FIG. 12 is an exemplary user interface in a mobile application. The Digital Makeup Artist 520 may display custom recommendations 1201 of various looks. In 513, the user may select a recommended look. The look may be selected by using a pointing device to move a pointer on the display screen 210, a pointing device on the touch screen 221, or by entering a voice command, such as: "Select LOOK1." There may be more custom recommendations that can be displayed on the display screen 210. The user may view other recommended looks, for example, by selecting a function to display a next screen of looks. In one embodiment, the user interface may provide a scroll bar 1203 that may allow scrolling to view the additional looks.

Figure 13:
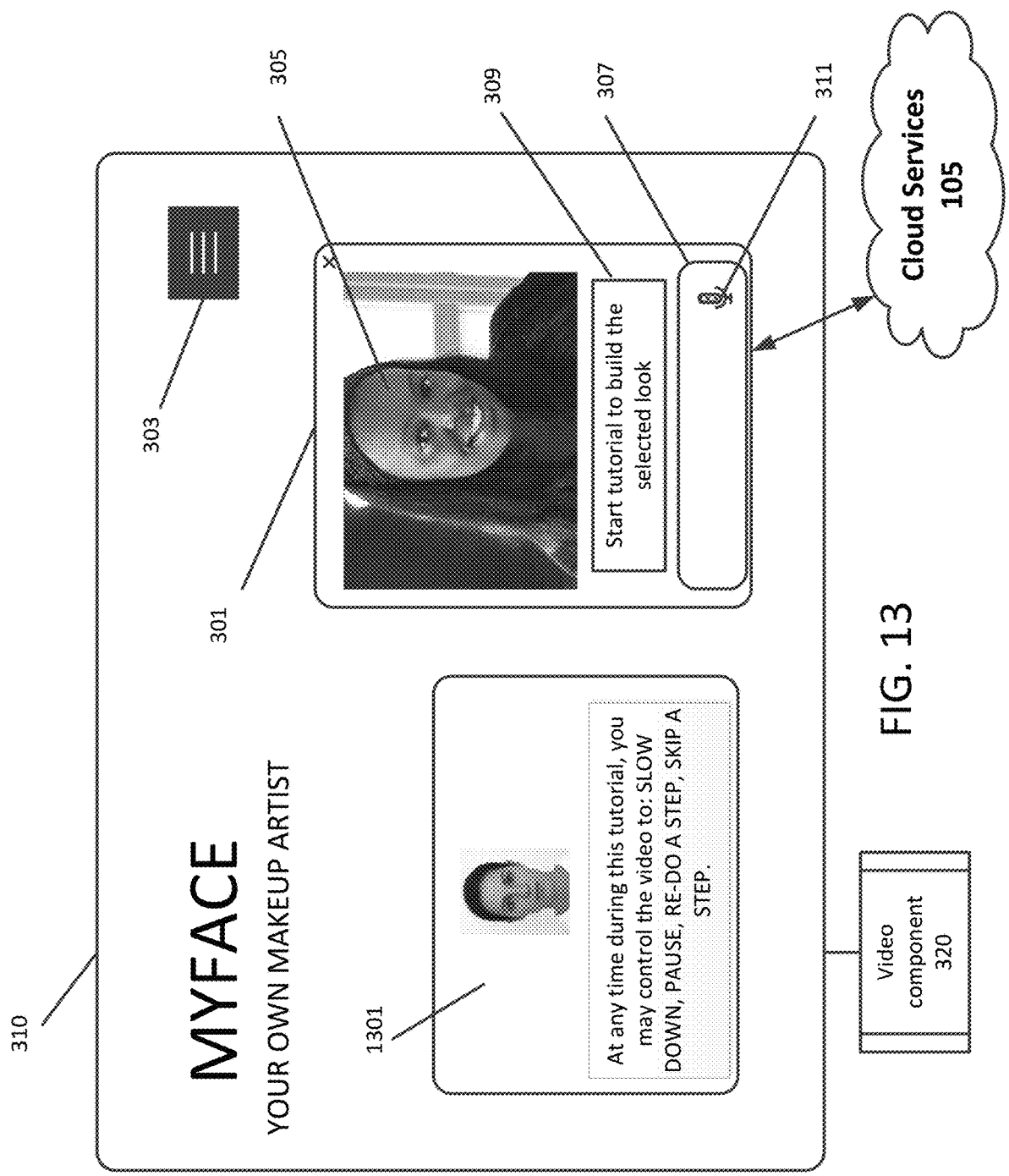
FIG. 13 is a user interface in a mobile application in accordance with an exemplary aspect of the disclosure.
Figure 14:
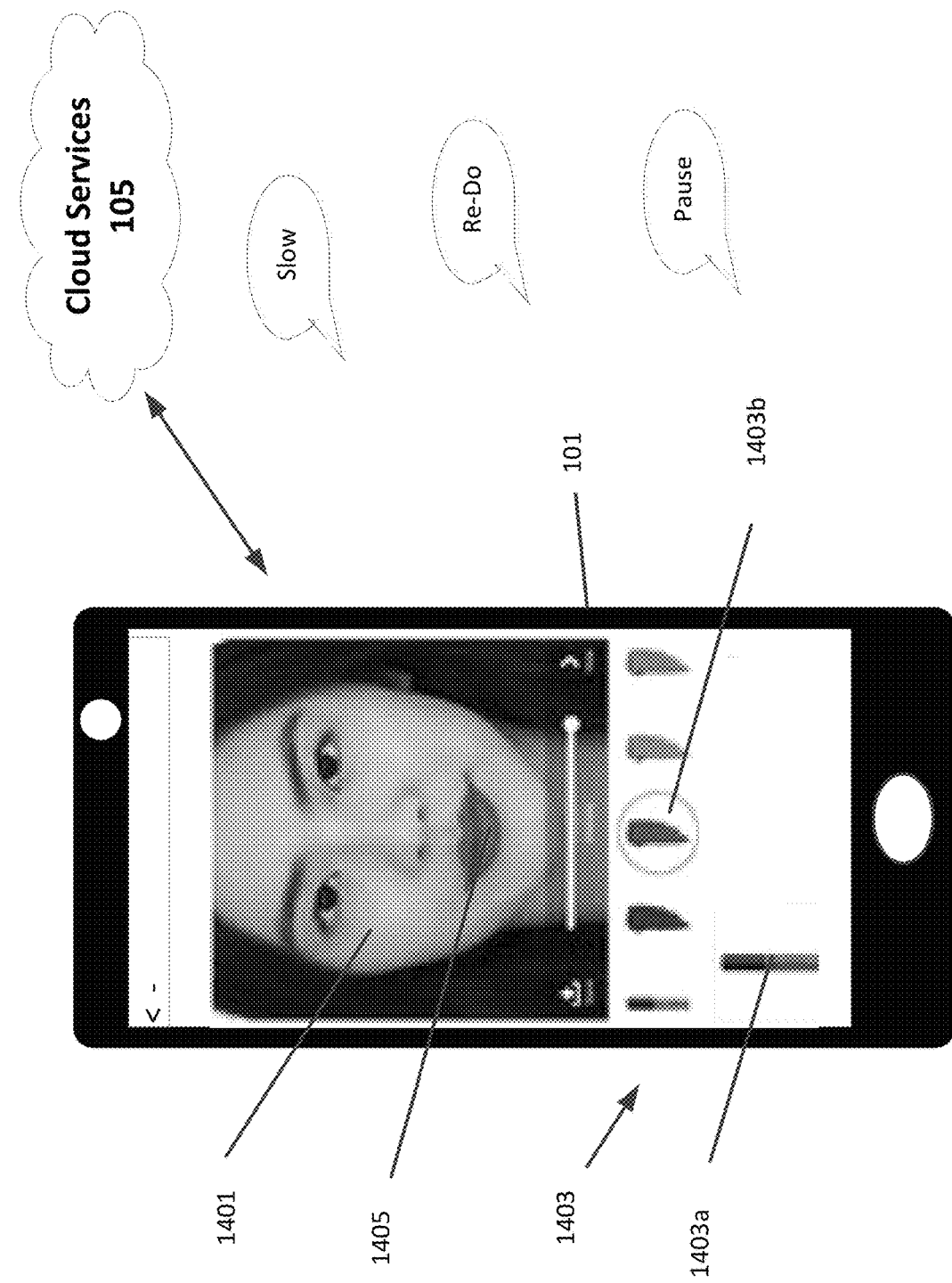
FIG. 14 is an exemplary mobile application in accordance with an exemplary aspect of the disclosure.

Once the user has selected a look, in 515, the system 510 may begin performing steps for creating the selected look. FIG. 13 illustrates a user interface that may be displayed to begin a tutorial in a mobile application in accordance with an exemplary aspect of the disclosure. During the tutorial, in 517, information may be fed back to the system 510 in order to improve future interactions. Also, the tutorial is interactive. The tutorial may be controlled using commands, including SLOW DOWN, PAUSE, RE-DO A STEP, SKIP A STEP. A message 1301 may be displayed to inform the user that commands can be used to control the tutorial. The commands, may be selected on the user interface using a pointing device, or may be entered as verbal commands when the microphone 241 is active (e.g., via the microphone icon 311). The tutorial being played may be corrected to obtain a custom tutorial experience. For example, the command RE-DO A STEP may include an option to make a change to the tutorial. The system 510 may save changes that are made to the tutorial to the database 107 as look preference data that may be used to improve future interactions. As noted above, a version of the mobile application 111 may be for devices with smaller screens than laptop computers or desktop computers. FIG. 14 is an exemplary mobile application in accordance with an exemplary aspect of the disclosure. Provided the smaller screen, interaction with the digital makeup artist 520 may be through audio and/or text. In such case, the commands may be input verbally. During the tutorial, a face image of the user 1401 may be displayed, and the tutorial may involve applying makeup 1403a of a color 1403b selected from a makeup palette 1403 to a part 1405 of the face image 1401.

Figure 15:
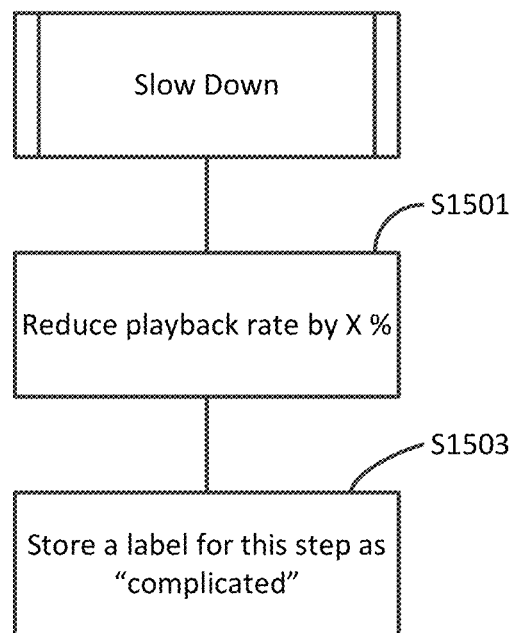
FIG. 15 is a flowchart for a SLOW DOWN video control command in accordance with an exemplary aspect of the disclosure.

FIGS. 15, 16, 17, 18 are flowcharts for video control commands. As mentioned above, the tutorial may be controlled using commands, including SLOW DOWN, PAUSE, RE-DO A STEP, SKIP A STEP. FIG. 15 is a flowchart of the SLOW DOWN video control command. The SLOW DOWN command may perform a function, S1501, of reducing the playback rate by a certain amount (X %). In addition, the call for the SLOW DOWN command may indicate that the user believes that the portion of the video being played is complicated, or requires careful viewing. The performance of a function of reducing the playback rate may include, in S1503, storing information indicating that the step is complicated.

Figure 16:
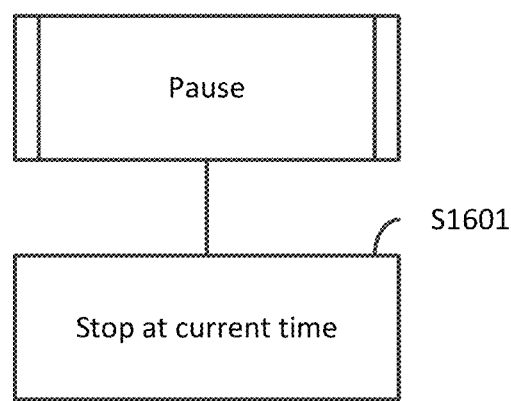
FIG. 16 is a flowchart for a PAUSE video control command in accordance with an exemplary aspect of the disclosure.

FIG. 16 is a flowchart of the PAUSE video control command. The PAUSE command may perform a function, S1601, of stopping playback of the video at a certain time point (a position in seconds, or a time code).

Figure 17:
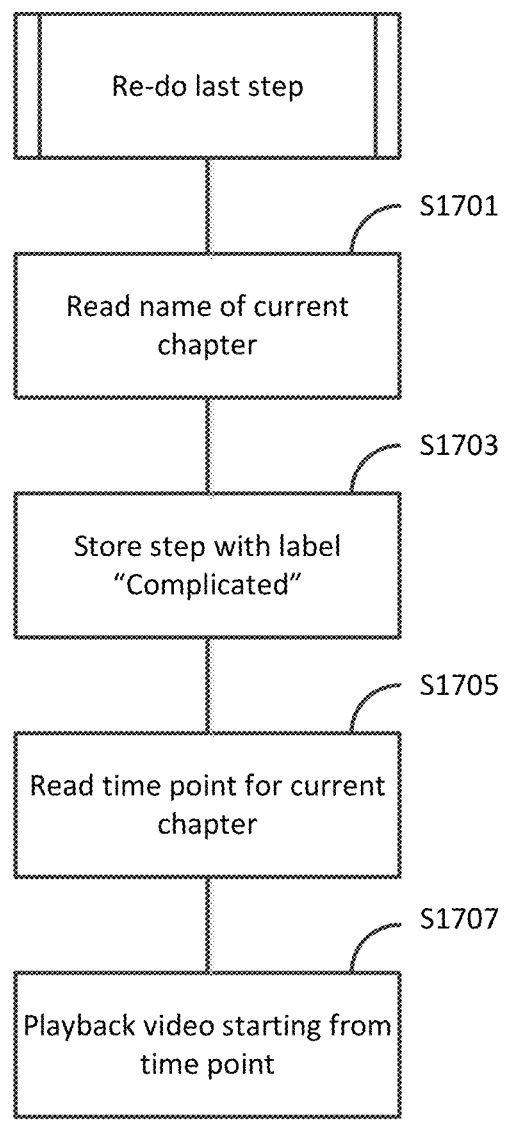
FIG. 17 is a flowchart for a RE-DO LAST STEP video control command in accordance with an exemplary aspect of the disclosure.

FIG. 17 is a flowchart of the RE-DO A STEP video control command. The RE-DO A STEP command may perform a function that makes use of chapters. In some embodiments, the beginning of each chapter may include a start image frame and time point. Alternatively, the beginning of each chapter could be marked by a chapter frame. The RE-DO A STEP command may perform a function that may cause the video to go back to the beginning of the current chapter and start playback over beginning from a starting image of the chapter. In S1701, the function may include reading the name of the current chapter. In S1703, the function may store information indicating that the step associated with the current chapter is complicated. In 1705, the function may read an identifier that indicates the position of the beginning of the chapter, which could be a time point, or a chapter frame.

As will be described later, in some embodiments, the video frames may be dynamically generated, for example, prior to playback of a chapter, or as the video frames are being played. By dynamically generating video frames, changes can be incorporated in the video, for example a change to use a makeup of a different shade and/or finish. The beginning of a chapter includes a starting image, which may be a state of a face image combined with a mask filter. Any makeup application performed during the playback of the chapter may be saved as the next state of a face image combined with a mask filter.

In S1707, the video may be played back starting from the beginning of the chapter.

Figure 18:
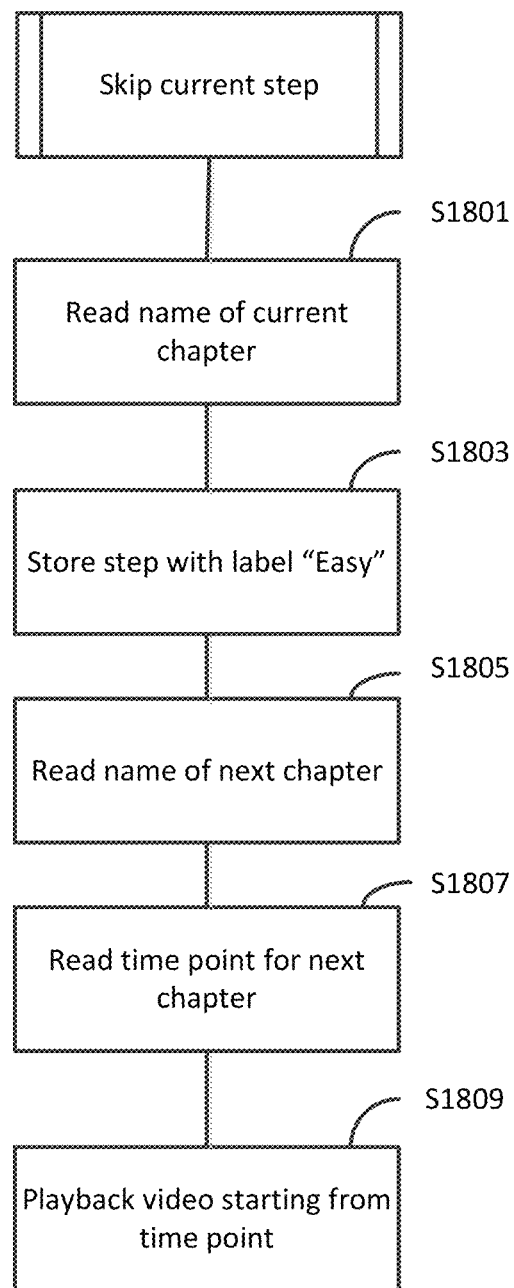
FIG. 18 is a flowchart for a SKIP CURRENT STEP video control command in accordance with an exemplary aspect of the disclosure.

FIG. 18 is a flowchart of the SKIP A STEP video control command. The SKIP A STEP command may perform a function that may cause the video to skip to the beginning of the next chapter. The function may begin by, in S1801, reading the name of the current chapter. Skipping a step may be an indication that the step is easy and the user does not need to be shown how to perform the step. In S1803, the function may store information indicating that the step is easy. In S1805, the function may read the name of the next chapter, and in S1807, may read the time point associated with the next chapter. In S1809, the function may reset the video to start from the time point of the next chapter.

Figure 19:
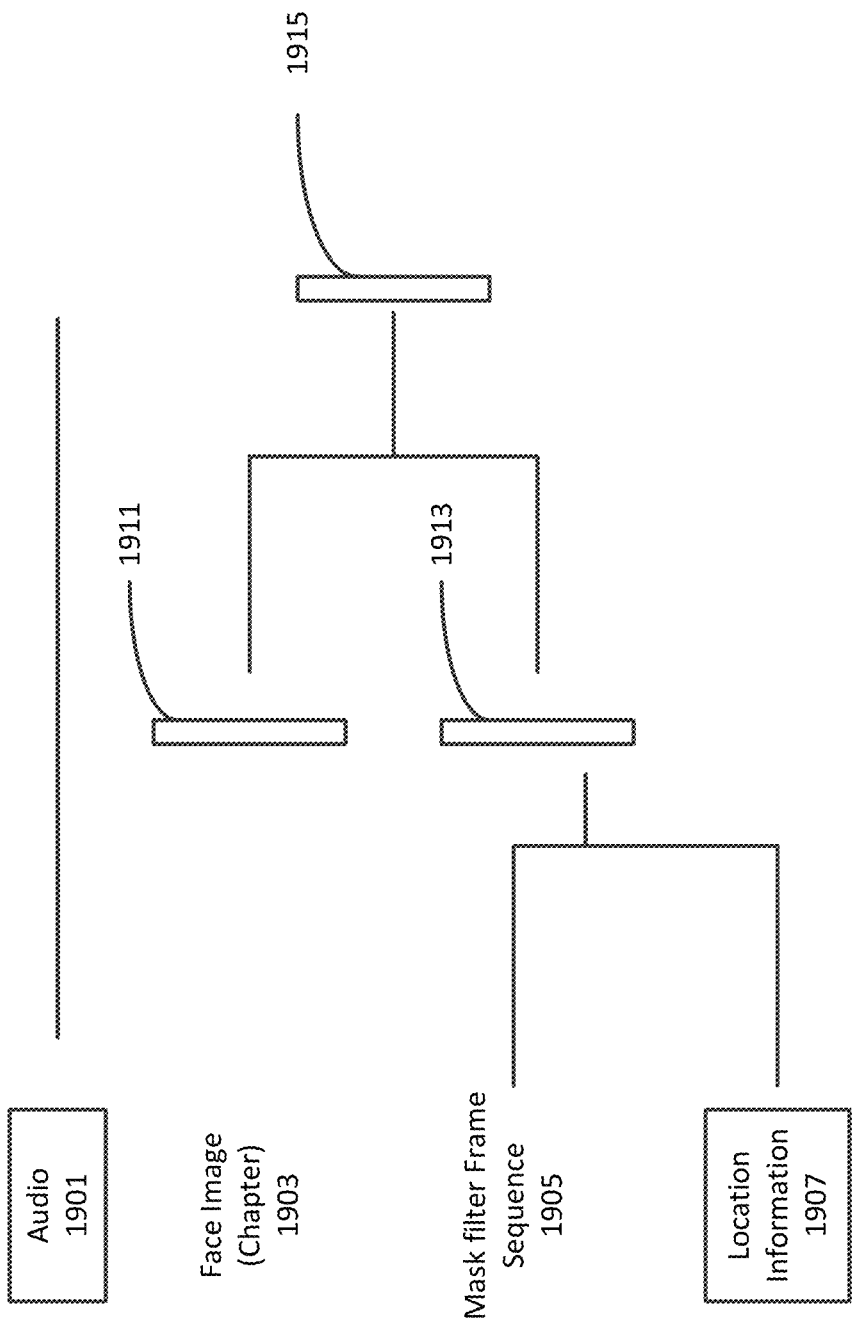
FIG. 19 is a block diagram of a video playback component in accordance with an exemplary aspect of the disclosure.

FIG. 19 is a block diagram of a video playback component in accordance with an exemplary aspect of the disclosure. In some embodiments, the video playback component 320 may generate a video for a tutorial before playing back the video. In particular, the video playback component may perform operations with one or more frames in a tutorial video before rendering frames for display. Also, a video of a tutorial may be divided into chapters. The chapters may be used to divide a video for a makeup tutorial into individual steps, where each step may be replayed, as well as paused or stopped. Each chapter may be designed by a start frame. A chapter of the video may be for a step of applying makeup to a certain part of the user's face, and may be for applying a certain type of makeup. The video may begin with an image of the user's face that was captured with a camera. The video may use information obtained through the analysis of the face image, such as location and labels of parts of the user's face image, coloring, texture, and lighting. The video may also make use of the selected look chosen by the user. By default, the video may be for a tutorial on how to create the selected look using the user's face image and the information obtained from the face analysis.

As mentioned above, a chapter of the video may be for a step of applying makeup to a certain part of the user's face, and may be for applying a certain type of makeup. For example, a chapter may be for a step of applying a concealer to the eyelid of the user's face image. The concealer may be a makeup product that is provided for the selected look. In some embodiments, a makeup look may have a set of chapters, where each chapter may include one or more makeup products, where a makeup product has a set of characteristics, such as color, coverage, shade, and finish. The video playback component 320 may generate the selected look for the particular user's face and makeup products. A chapter may begin with an image of the user's face that was made up in a previous chapter, such that chapters represent cumulative results of makeup application. In some embodiments, the cumulative results are one or more mask filters that are separate from the original face image.

Regarding FIG. 19, a face image, or a mask filter for a face image 1903 may be provided at the beginning of a chapter as a start image upon which further digital makeup will be applied for the tutorial. The beginning of a chapter may include location information 1907 of a part of a face (facial feature) where the makeup product will be applied, as well as information on the makeup product, its characteristics, and type of strokes that might be applied by a specific type of makeup applicator. The chapter may include an accompanying audio component, 1901. A chapter may include a sequence of mask filters 1905 of desired features that may be used to create video frames for the tutorial. Each video frame may be generated by blending a prior frame 1911 and a desired feature 1913 to obtain a resulting feature 1915. One or more feature masks may be used that represent applying a particular makeup using a makeup applicator for a particular facial feature.

Figure 20:
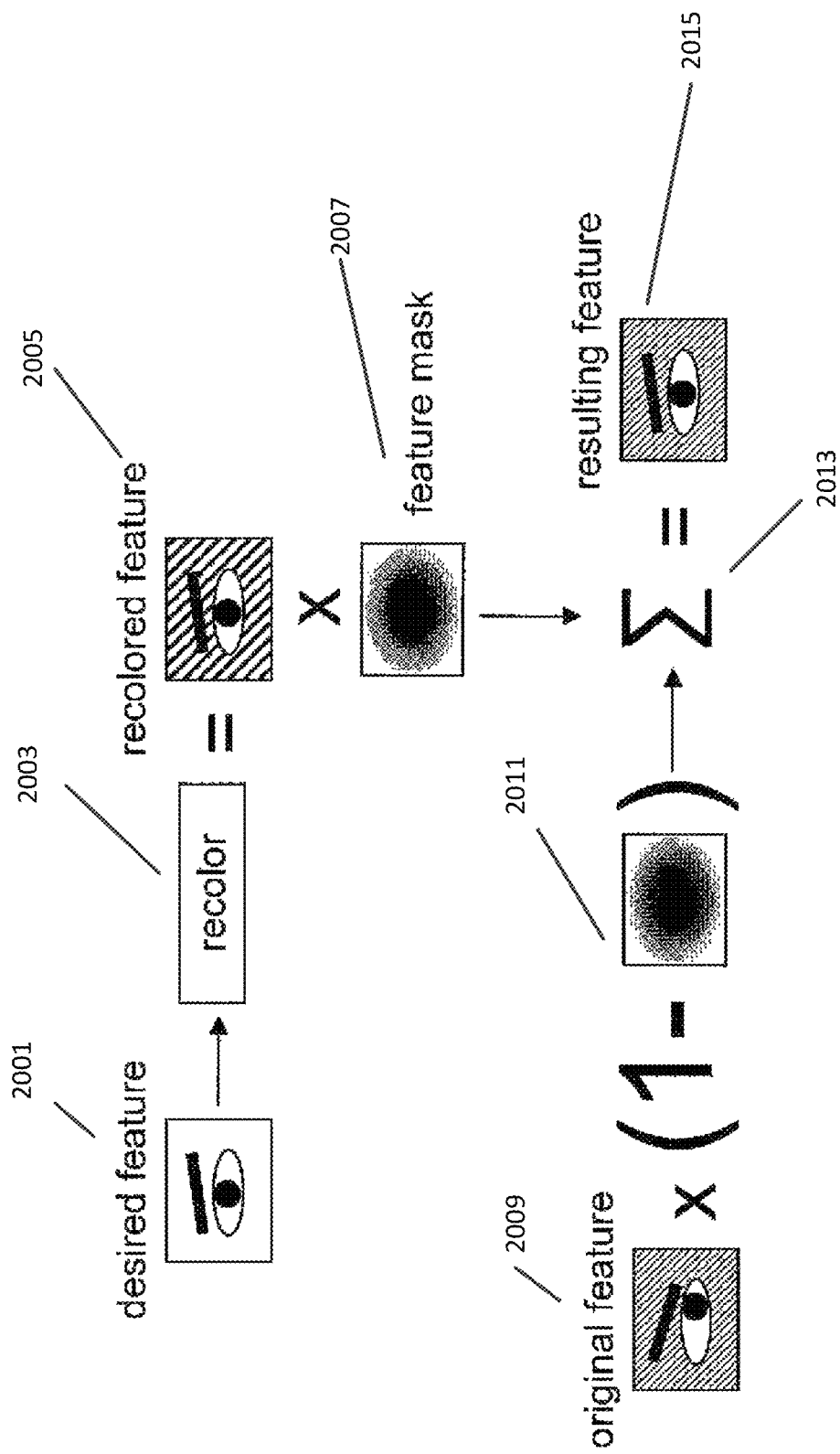
FIG. 20 illustrates a blending process that may be used to create a video frame based on a desired feature and an original feature.
Figure 21A:
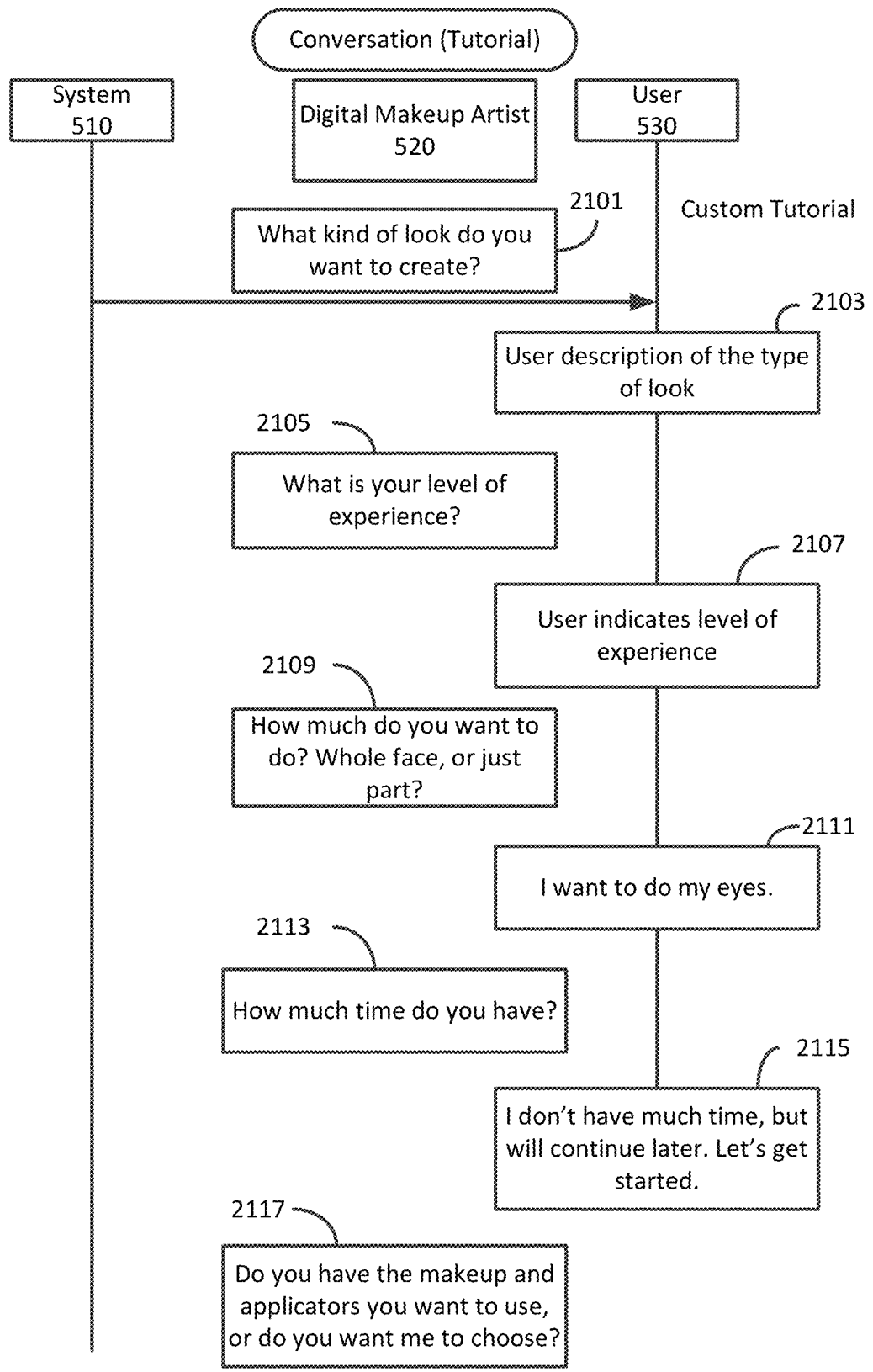
FIGS. 21A to 21F are a sequence diagram for an exemplary interaction using the digital makeup artist for a makeup tutorial in accordance with an exemplary aspect of the disclosure.
Figure 21B:
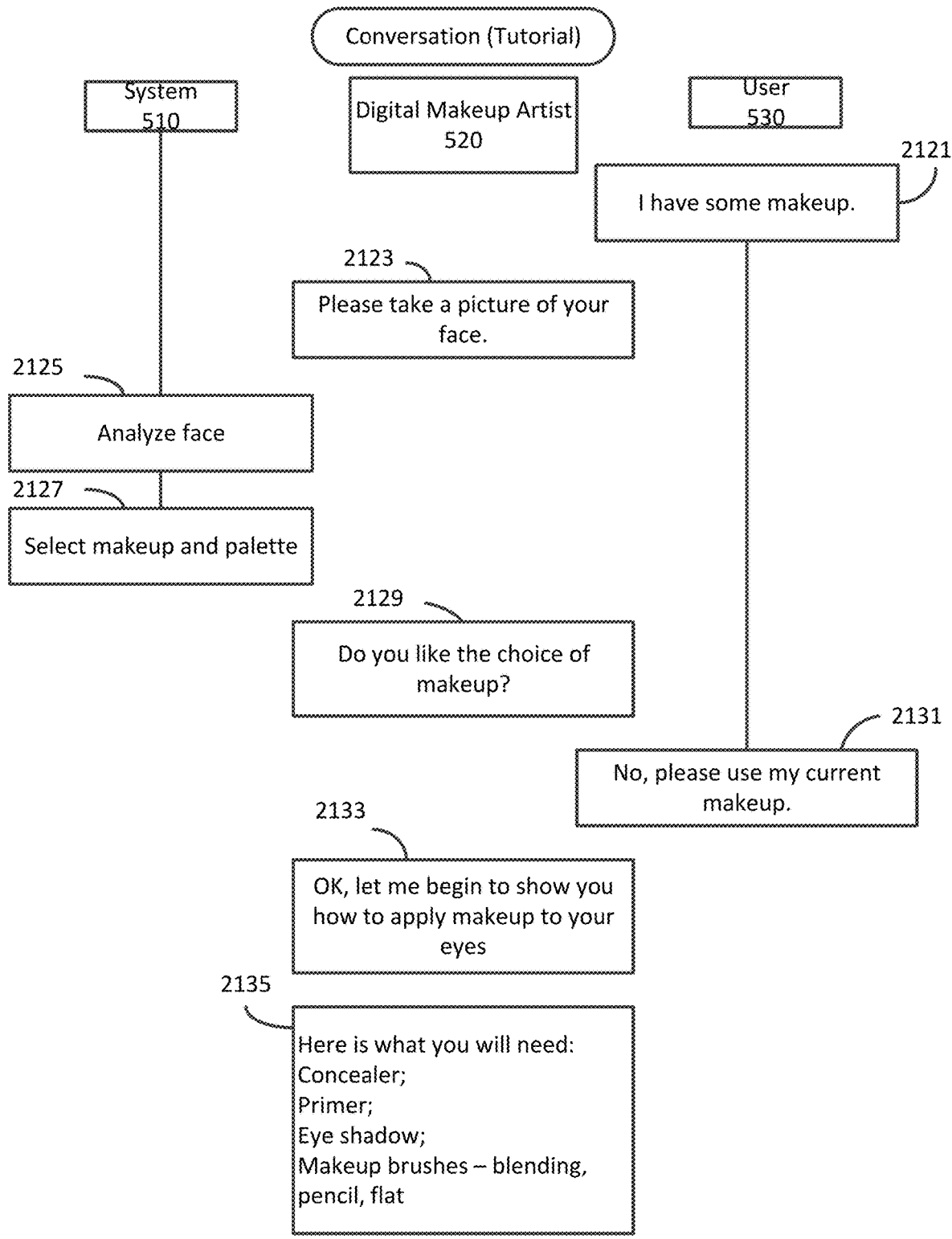
Figure 21C:
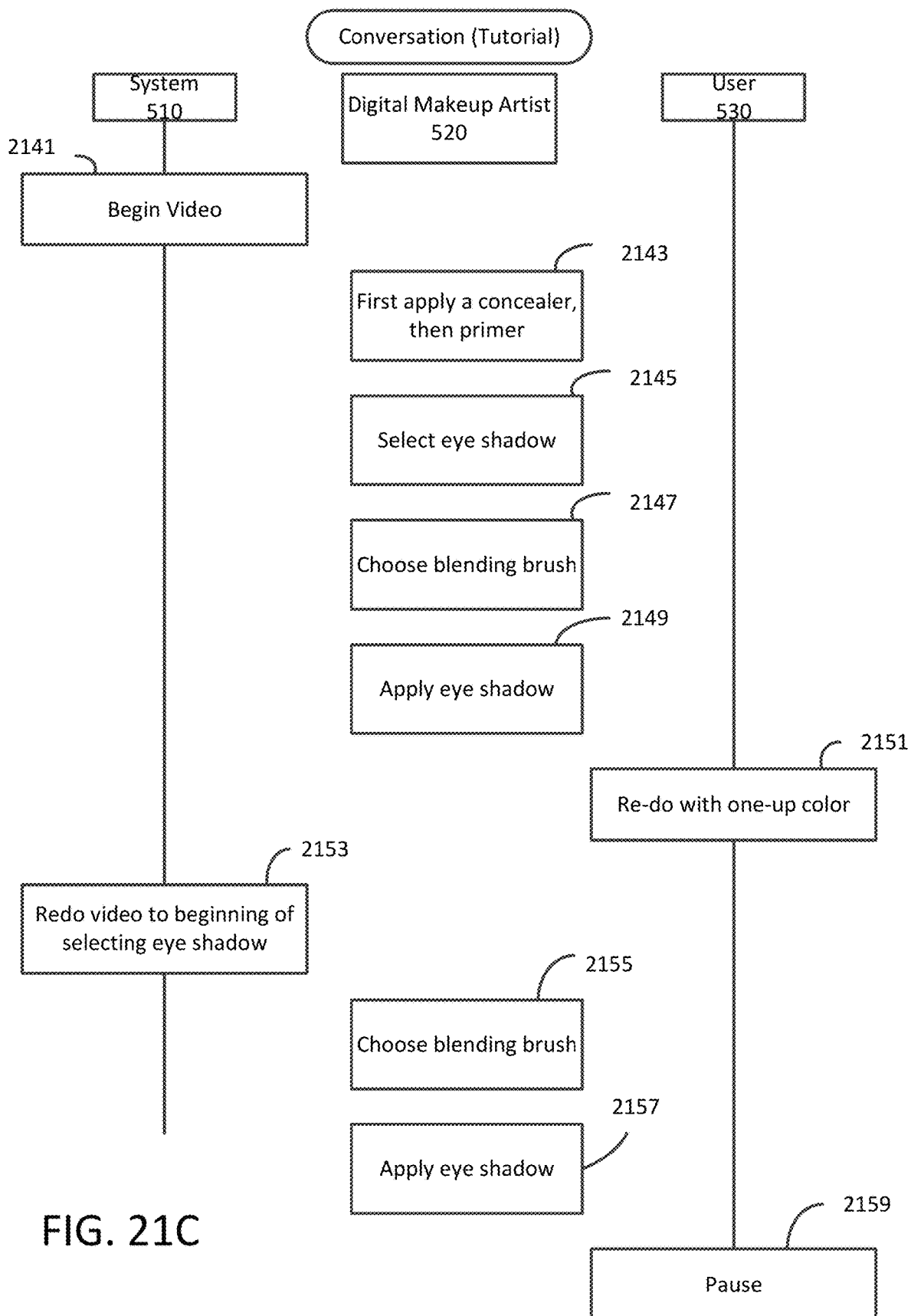
Figure 21D:
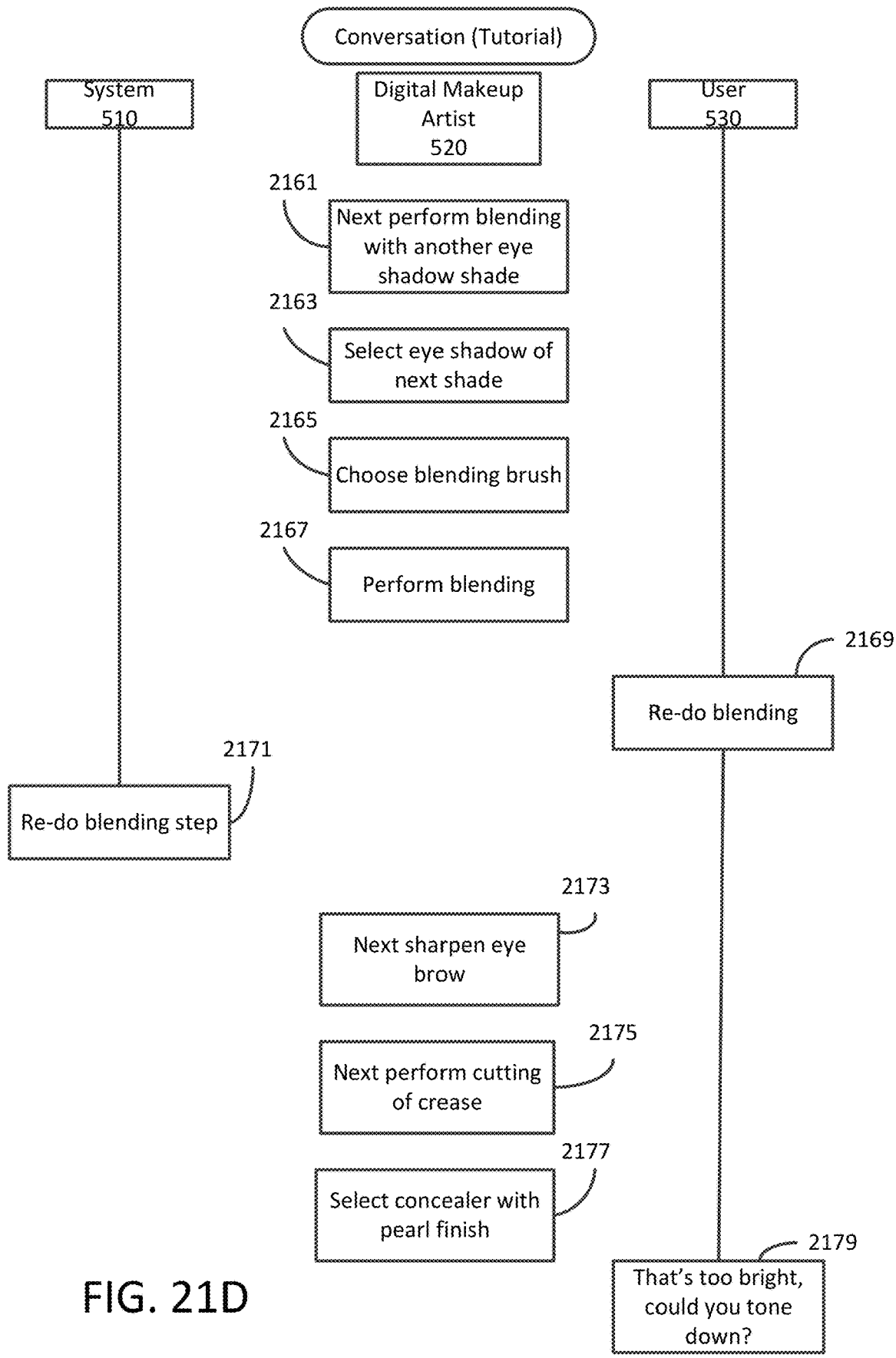
Figure 21E:
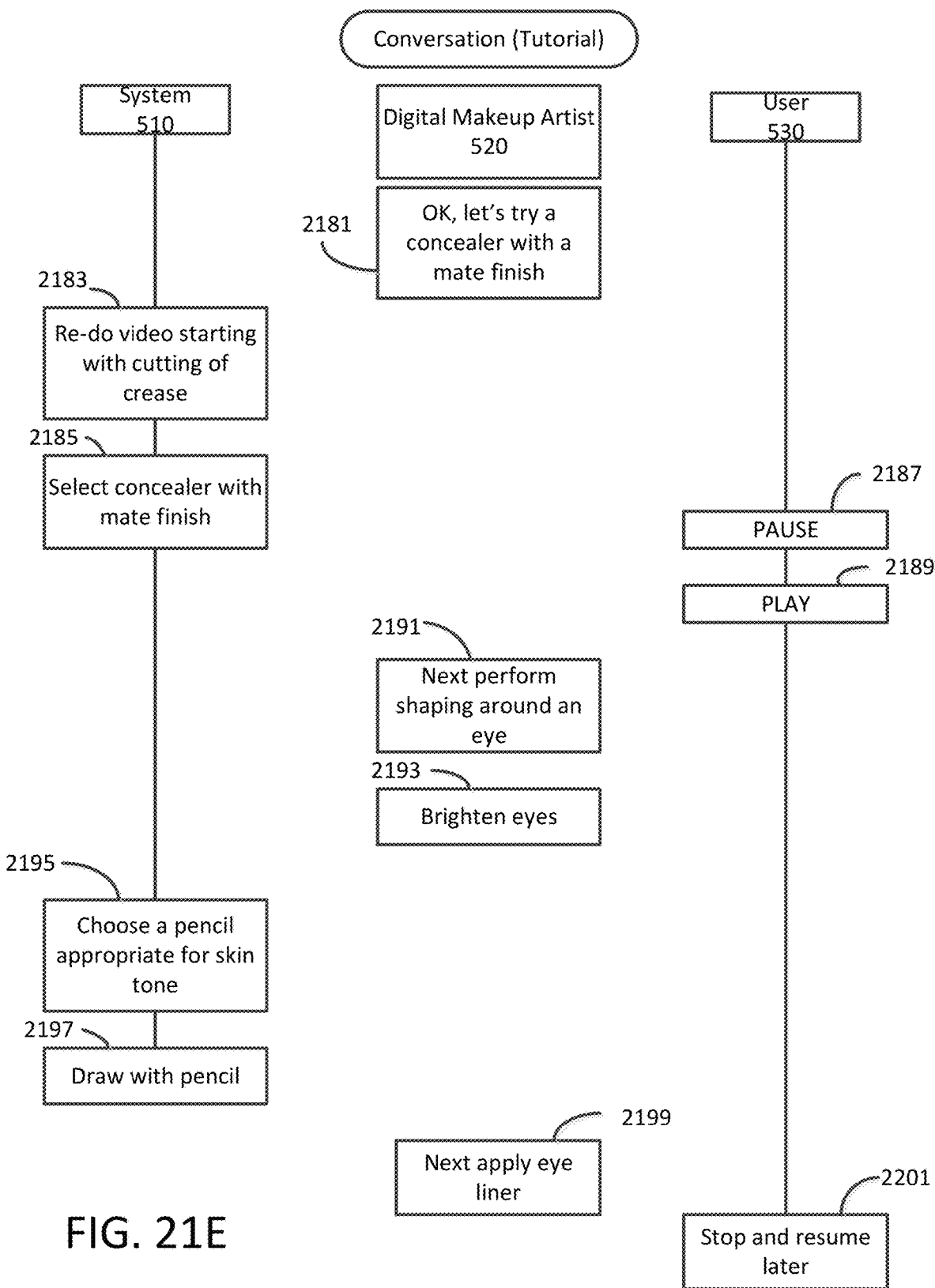
Figure 21F:
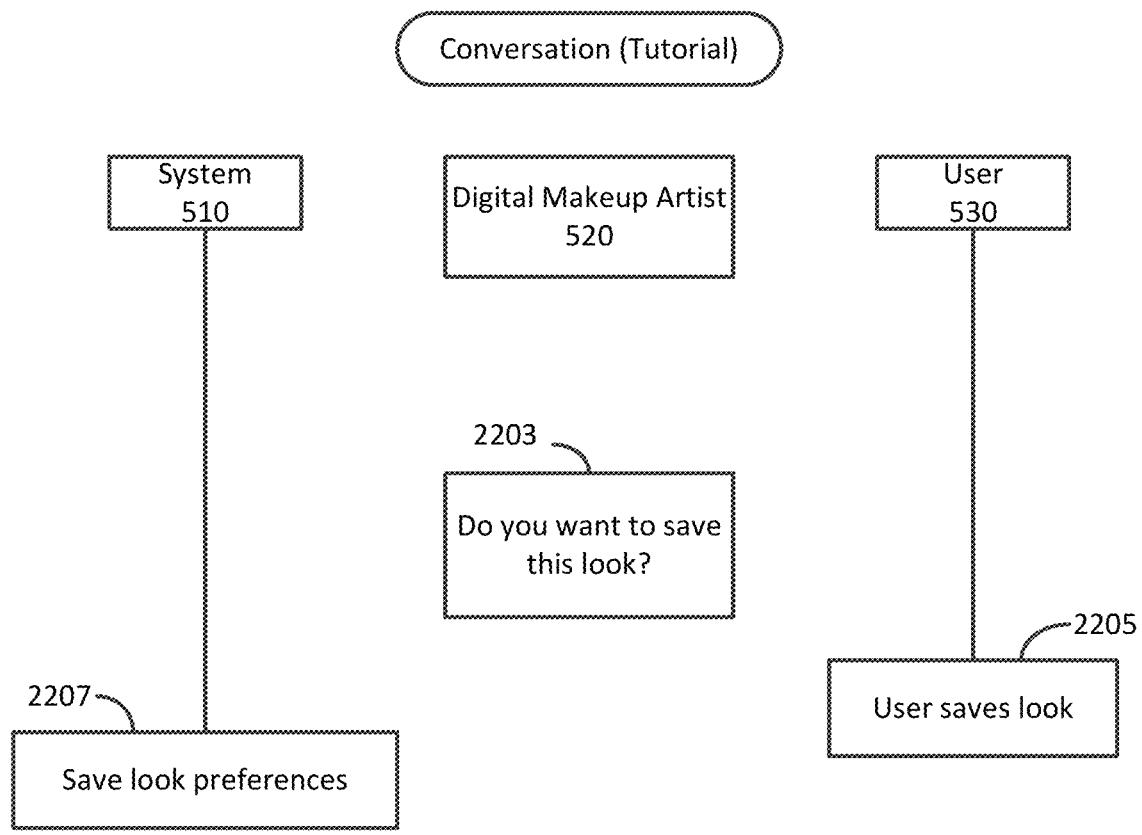
Figure 22A:
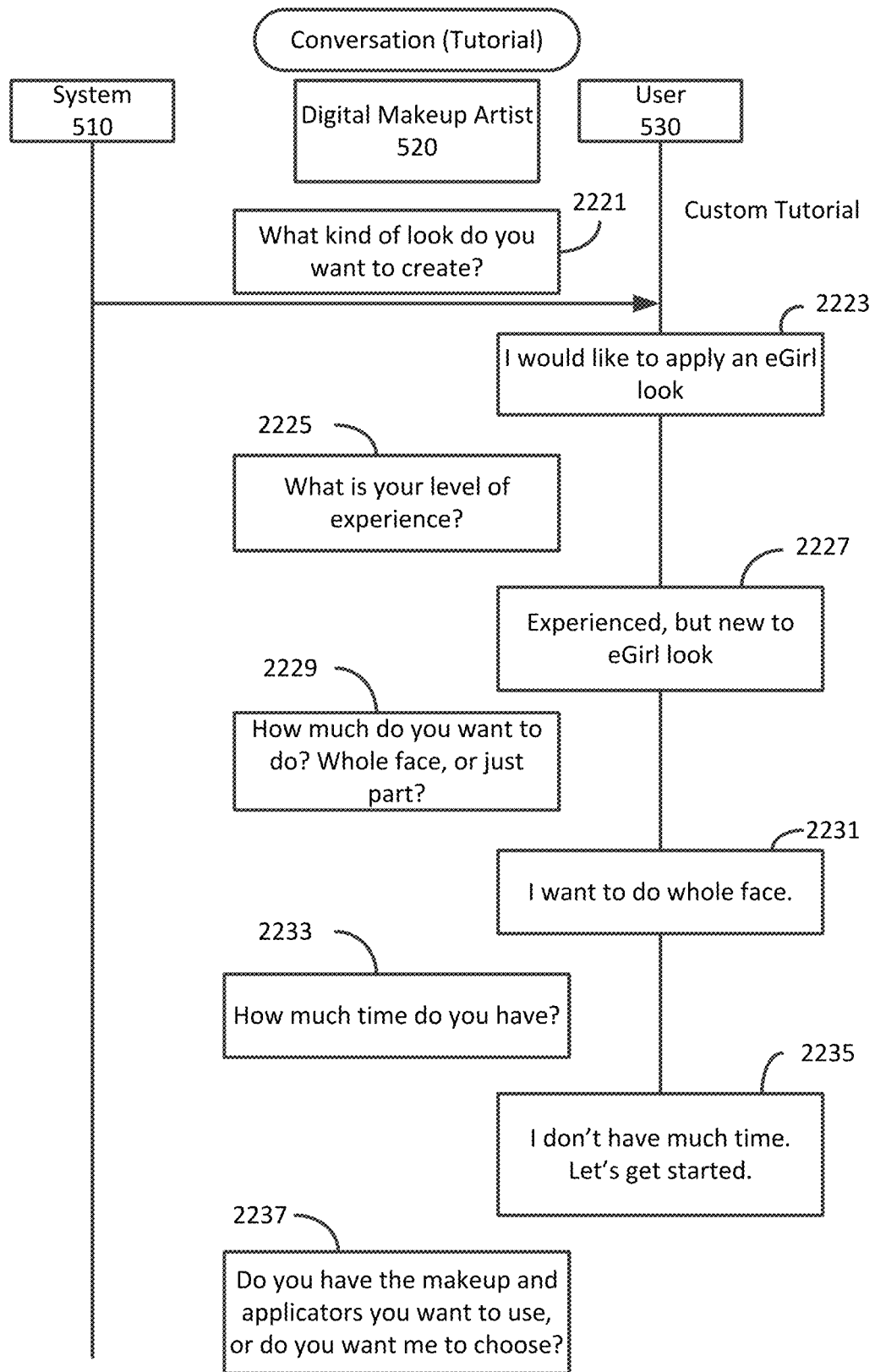
FIGS. 22A to 22E are a sequence diagram for an exemplary interaction use case of using the Digital Makeup Artist 520 for a makeup tutorial in accordance with an exemplary aspect of the disclosure.
Figure 22B:
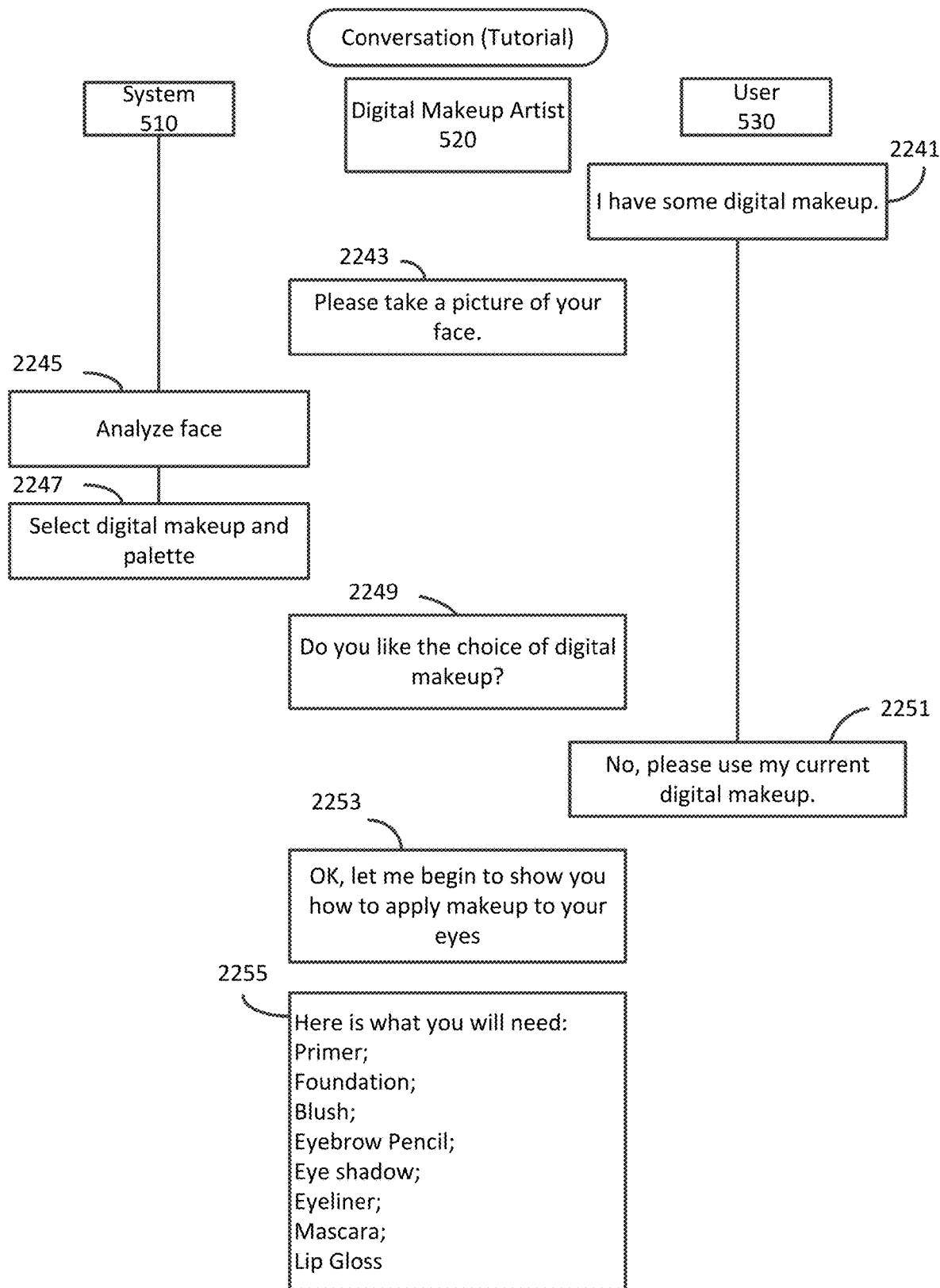
Figure 22C:
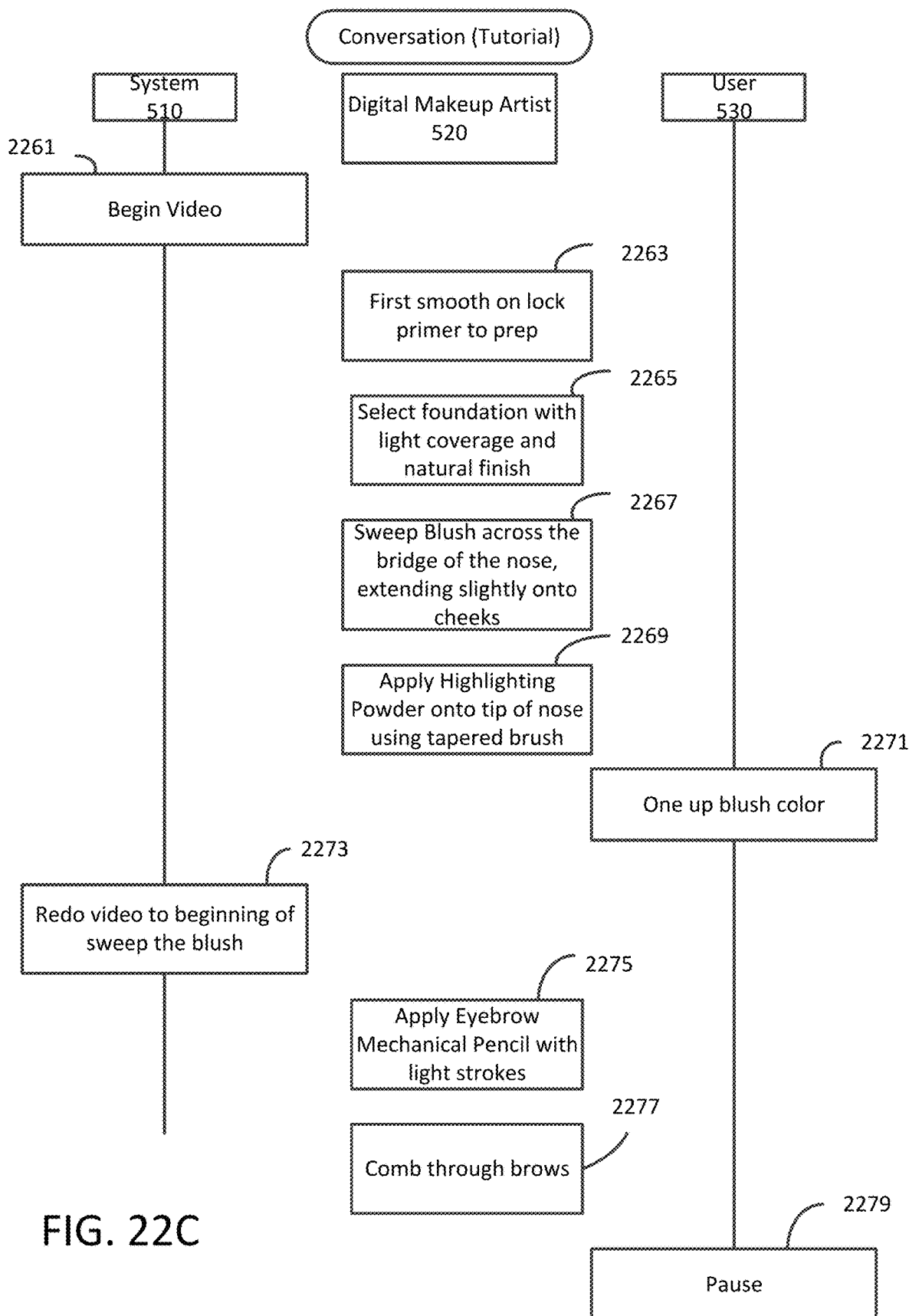
Figure 22D:
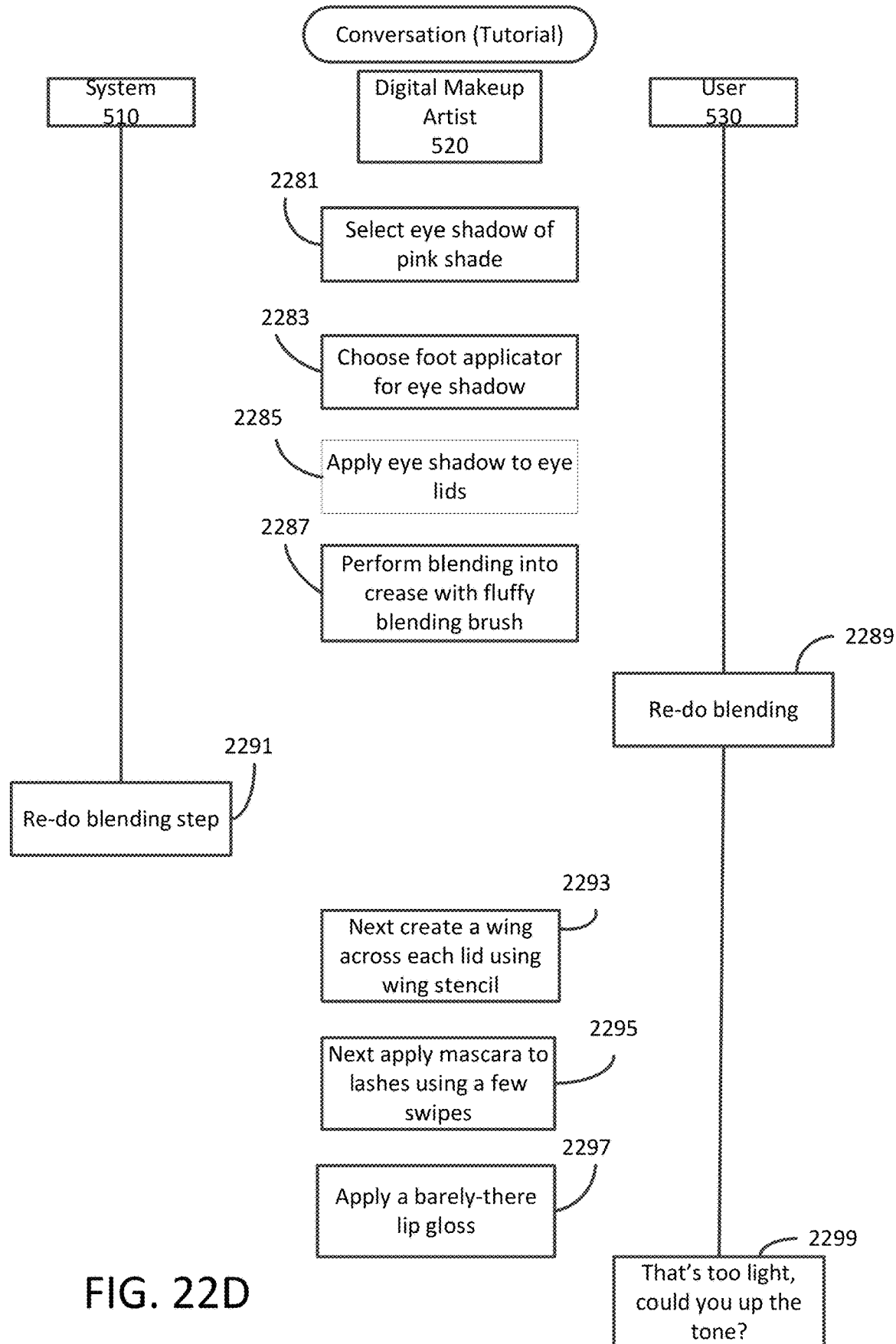
Figure 22E:
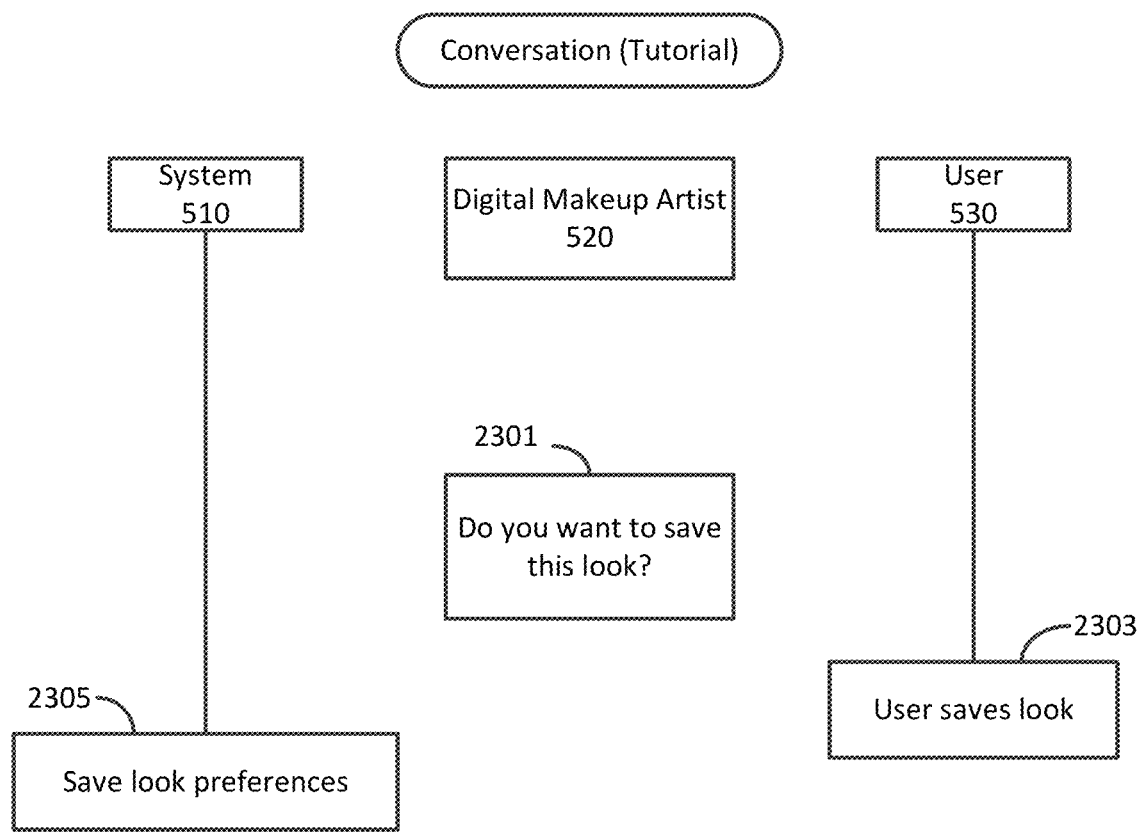

FIG. 20 illustrates a blending process that may be used to create a video frame based on a desired feature and an original feature. The blending of a facial feature is accomplished as follows.

1. The desired feature 2001 is recolored, 2003, to match the color(s) of the original feature and obtain a recolored feature 2005.

2. The recolored feature 2005 is multiplied by a feature mask filter 2007.

3. The original feature 2009 is multiplied by the inverse 2011 (i.e., one minus each of the mask values, which range from 0 to 1) of the feature mask filter.

4. The resulting images of 2 and 3 are added 2013 pixel by pixel to make the final blended feature image 2015.

When the tutorial is completed, or when the user has completed as much of the tutorial that they wish to accomplish, the user interface may provide a choice to save the completed look. If the user chooses to save the completed look, YES in 519, in 521, the look may be saved as a finished look, or the steps taken to apply makeup during the tutorial may be saved as a custom filter, or a sequence of custom filters. In addition, in 523, the user interface may provide an option to transfer the custom look or apply/transport the custom filter as an image to other platforms (525).

An example operation of the system is provided in FIGS. 21A to 21F. FIGS. 21A to 21F are a sequence diagram for an exemplary interaction use case of using the Digital Makeup Artist 520 for a makeup tutorial in accordance with an exemplary aspect of the disclosure. The sequence diagram of FIGS. 21A to 21F includes operations and communication by a System 510, the Digital Makeup Artist 520 and a User 530. As mentioned above, the System 510 may be a computer device, such as a desktop computer, laptop computer 103, tablet computer, or mobile device 101, to name general types. The System 510 may also take the form of a combination of a computer device and a cloud service 105 (see FIG. 1). In either case, a Digital Makeup Artist 520 may be performed as part of a mobile application 111 and the User 530 may interact with the Digital Makeup Artist 520 either through speech, text, or a combination of speech and text.

The User 530 may first select the mobile application to be executed in a user interface of a computer device. Once the mobile application is started, the User 530 may be given a choice of using the Digital Makeup Artist 520 for teaching in a tutorial or providing advice in a makeup consultation session (to be described later). In the case that the user has chosen to use the Digital Makeup Artist 520 for a tutorial, in 2101, the Digital Makeup Artist 520 may ask a question, "What kind of look do you want to create." In 2103, the User 530 may state a name of a look. The look may be a pre-existing type of look, or may the name of a new look that the User 530 has in mind. As an alternative, the System 510 may provide a list of pre-existing looks for the User 530 to choose from. The pre-existing looks may be stored in the database 107 or may be provided locally in the App 111.

In some embodiments, in 2105, the Digital Makeup Artist 520 may ask the User 530 to provide their level of experience in applying makeup. The level of experience may be a category, such as New, Experiences, Expert, and Professional. The System 510 may present a list of experience levels for the User 530 to choose from. In 2107, the User 530 indicates a level of experience.

In 2109, the Digital Makeup Artist 520 may ask the User 530 how much of their face do they want to apply makeup in a tutorial. A tutorial may be provided for a part of a face or the whole face. In 2111, the User may choose to have a tutorial presented for a part of the face, such as their eyes.

In some embodiments, in 2113, the Digital Makeup Artist 520 may ask the User 530 how much time they have for a tutorial. The tutorial may be a shortened version if a user does not have much time, or may be a full version if the user has sufficient time for the full tutorial. The User 530 may provide a response that is qualitative, or may provide a response that is an amount of time in minutes. In 2115, the User 530 may provide a qualitative response, such as, "I don't have much time." The System 510 may interpret this response as that a shortened version of a tutorial should be performed. However, the User 530 may further express that they are willing to save the tutorial at an intermediate state to be completed later. In the latter case, the System 510 may save the tutorial at a point so that it may be played back starting from an intermediate point.

In some embodiments, in 2117, the Digital Makeup Artist 520 may ask the User 530 to determine that the User 530 wishes to use any necessary makeup and makeup applicators that are already available for use, for example, makeup products that the User 530 has purchased, or that the User 530 would prefer that the System 510 may provide makeup and makeup applicators that may be needed for the tutorial. In 2121, the User 530 may provide a qualitative response to indicate that they have some makeup products, but would be open to the System 510 choosing makeup and makeup applicators.

In 2123, the Digital Makeup Artist 520 may ask the User 530 to take a photo of their face. The photo may be taken with a camera 231 that is built in to the mobile device 101, or with a camera that is external.

In 2125, the System 510 may perform analysis of the face image. As mentioned above, the face analysis may be performed to obtain locations of the parts of the face, and facial features including skin color, skin texture, lighting, as well as past look preferences, which is information that may be used in generating a video for the tutorial.

In 2127, the System 2125 may select a makeup for application in the tutorial.

In 2129, the Digital Makeup Artist 520 may ask the User 530 if they like the choice of makeup. In 2131, the User 530 may respond that they do not agree with the choice, and would rather have the tutorial performed using a makeup provided by the User.

In 2133, the Digital Makeup Artist 520 may indicate that the tutorial will begin. In some embodiments, in 2135, the Digital Makeup Artist 520 may provide a list of products that may be used during the tutorial, in case that the User 530 would like to obtain the products to apply makeup during the tutorial.

In 2141, the System 510 may begin generating and playing the video of the tutorial. In the example tutorial, the Digital Makeup Artist 520 may start the tutorial by stating initial makeup that may be applied. In 2143, the Digital Makeup Artist 520 may speak or provide a text instruction indicating that a concealer will be applied first, followed by a primer.

The video of the tutorial may be played by the System 510 in conjunction with instruction by the Digital Makeup Artist 520, either through speech output, text output, or both speech and text. In S1845, the Digital Makeup Artist 520 may provide instruction for selecting an eye shadow. In 2147, the Digital Makeup Artist 520 may provide instruction for choosing a blending brush. In 2149, the Digital makeup Artists 520 may provide instruction for applying eye shadow.

At time points along the tutorial, the User 530 may input a video control command. As an example, in 2151, the User 530 may input a command to RE-DO A STEP. In some embodiments, the command may include a request to make a change to a step, such as Re-do with a one-up color. The Digital Makeup Artist 520 may output a request for clarification as to what the user means by "one-up color." In 2153, the System 510 may generate new frames for a video beginning with selecting eye shadow of 2145 that uses a new color.

In 2155, the Digital Makeup Artist 520 may provide instruction for choosing a blending brush. In 2157, the Digital Makeup Artist 520 may provide instruction for applying eye shadow.

In 2159, the User 530 may input a command, such as PAUSE. The System 510 may perform a pause function, until the User 530 inputs a PLAY command.

In 2161, the Digital Makeup Artist 520 may provide instruction for performing blending with another shade of eye shadow. In 2163, the Digital Makeup Artist 520 may provide instruction for selecting an eye shadow of the next shade. In 2165, the Digital Makeup Artist 520 may provide instruction for choosing a blending brush. In 2167, the Digital Makeup Artist 520 may provide instruction for performing blending.

In 2169, the User 530 may input a command, such as "RE-DO A STEP," to re do the blending. In 2171, the System 510 may restart the video from the beginning of the blending step.

In 2173, the Digital Makeup Artist 520 may provide instruction for performing sharpening of an eye brow. In 2175, the Digital Makeup Artist 520 may provide instruction for performing a step of cutting of crease. In 2177, the Digital Makeup Artist 520 may provide instruction for performing a step of selecting a concealer with a pearl finish.

In 2179, the Digital Makeup Artist 520 may input a statement that the concealer is too bright, and ask if the concealer can be toned down. In 2181, the Digital Makeup Artist 520 may respond by stating that it will try another concealer, which may be performed by issuing RE-DO A STEP with a change to another concealer.

In 2183, the System 510 may restart the video from the beginning of the step of cutting of a crease, depending on where the beginning of the chapter occurs. Then, in S1885, the System 510 may, as an example, select a concealer with mate finish and play the video with the selected concealer. In 2187, the User 530 may input a PAUSE command to take a moment to observe the result of the new concealer. In 2189, the User 530 may input a PLAY command to start playing the video.

In 2191, the Digital Makeup Artist 520 may provide instruction for performing a step of shaping around an eye. In 2193, the Digital Makeup Artist 520 may provide instruction for performing a step of brightening eyes.

In 2195, the System 510 may choose a pencil that is appropriate for the user's skin tone. In 2197, the System 510 may draw on the face image using the chosen pencil.

In 2199, the Digital Makeup Artist 520 may provide instruction for performing a step of applying eye liner. At this point, in 2001, the User 530 may choose to stop the video to be resumed at a later time.

At some future time when the video has completed, in 2203, the Digital Makeup Artist 520 may output a question as to whether the user would like to save the finished look. In 2205, the User may choose to save the look and instruct the System 510 to save the look. In 2207, the System 510 saves the final look to the database 107. In some embodiments, the final look may be saved in the database as a preferred look for a certain type of look. For example, a look created using a tutorial may be saved as a preferred look for the type of look that was initially described (see 503 in FIG. 5). The final look may also be transported to other platforms, such as social media platforms or video conferencing platforms. Some current social media platforms where a user may post a photograph or video include Facebook, LinkedIn, Instagram, TikToc, and Snapchat, to name a few. Some current video conferencing platforms include Microsoft Teams, FaceTime, Google Hangouts or Google Meet, Zoom, GoToMeeting, Skype, to name a few. In addition, changes that were made during the tutorial, such as choice of shade of a color, finish of a color, may be stored as look preference data.

In some embodiments, in 2207, the System 510 may save to the database 107 one or more mask filters associated with the creation of the final look. The one or more mask filters may be transported to other platforms, and may be used to create a custom look for the other platform.

Social media and video conferencing have brought about a need for makeup on-the-fly, as well as have been an influence for social subcultures such as VSCO Girls, and aesthetic looks such as eGirl and Soft girl. The need is for a virtual makeup look for social media and video conferencing, i.e., augmented reality.

An example operation of the system is provided in FIGS. 22A to 22E for creating a virtual try-on for social media or video conferencing. FIGS. 22A to 22E are a sequence diagram for an exemplary interaction use case of using the Digital Makeup Artist 520 for a makeup tutorial in accordance with an exemplary aspect of the disclosure.

In the case that the user has chosen to use the Digital Makeup Artist 520 for a tutorial for creating a virtual try-on for video conferencing, in 2221, the Digital Makeup Artist 520 may ask a question, "What kind of look do you want to create." In 2223, the User 530 may state that they would like to apply an eGirl look. The eGirl look may be a look that a user would like to try for posting in social media or when video conferencing with friends or colleagues. A pre-existing eGirl look may be stored in the database 107 or may be provided locally in the App 111.

In some embodiments, in 2225, the Digital Makeup Artist 520 may ask the User 530 to provide their level of experience in applying makeup. The level of experience may be a category, such as New, Experienced, Expert, and Professional. The System 510 may present a list of experience levels for the User 530 to choose from. In 2227, the User 530 indicates a level of experience as Experienced, but is new to applying an eGirl look.

In 2229, the Digital Makeup Artist 520 may ask the User 530 how much of their face do they want to apply makeup in a tutorial. A tutorial may be provided for a part of a face or the whole face. In 2231, the User may choose to have a tutorial presented for the whole face.

In some embodiments, in 2233, the Digital Makeup Artist 520 may ask the User 530 how much time they have for a tutorial. The tutorial may be a shortened version if a user does not have much time, or may be a full version if the user has sufficient time for the full tutorial. The User 530 may provide a response that is qualitative, or may provide a response that is an amount of time in minutes. In 2235, the User 530 may provide a qualitative response, such as, "I don't have much time." The System 510 may interpret this response as that a shortened version of a tutorial should be performed. In some embodiments, in 2237, the Digital Makeup Artist 520 may ask the User 530 to determine that the User 530 wishes to use any necessary digital makeup and makeup applicators that are already available for use, for example, digital makeup products that the User 530 has purchased, or that the User 530 would prefer that the System 510 may provide digital makeup and makeup applicators that may be needed for the tutorial. In 2241, the User 530 may provide a qualitative response to indicate that they have some digital makeup products.

In 2243, the Digital Makeup Artist 520 may ask the User 530 to take a photo of their face. The photo may be taken with a camera 231 that is built in to the mobile device 101, or with a camera that is external.

In 2245, the System 510 may perform analysis of the face image. As mentioned above, the face analysis may be performed to obtain locations of the parts of the face, and facial features including skin color, skin texture, lighting, as well as past look preferences, which is information that may be used in generating a video for the tutorial.

In 2247, the System 510 may select a digital makeup for application in the tutorial.

In 2249, the Digital Makeup Artist 520 may ask the User 530 if they like the choice of digital makeup. In 2251, the User 530 may respond that they do not agree with the choice, and would rather have the tutorial performed using digital makeup provided by the User.

In 2253, the Digital Makeup Artist 520 may indicate that the tutorial will begin. In some embodiments, in 2255, the Digital Makeup Artist 520 may provide a list of digital makeup products that may be used during the tutorial, in case that the User 530 would like to obtain the products to apply makeup during the tutorial.

In 2261, the System 510 may begin generating and playing the video of the tutorial. In the example tutorial, the Digital Makeup Artist 520 may start the tutorial by stating initial makeup that may be applied. In 2263, the Digital Makeup Artist 520 may speak or provide a text instruction indicating that a primer will be smoothed on, in order to prep for foundation.

The video of the tutorial may be played by the System 510 in conjunction with instruction by the Digital Makeup Artist 520, either through speech output, text output, or both speech and text. In 2265, the Digital Makeup Artist 520 may provide instruction for selecting foundation having light coverage and natural finish. In 2267, the Digital Makeup Artist 520 may provide instruction for sweeping Blush across the bridge of the nose, and extending slightly onto the cheeks. In 2269, the Digital makeup Artists 520 may provide instruction for applying Highlighting Power onto tip of nose using tapered brush.

At time points along the tutorial, the User 530 may input a video control command. As an example, in 2271, the User 530 may input a command to RE-DO A STEP. In some embodiments, the command may include a request to make a change to a step, such as Re-do with a one-up blush color. The Digital Makeup Artist 520 may output a request for clarification as to what the user means by "one-up blush color." In 2273, the System 510 may generate new frames for a video beginning with sweeping blush of 2267 that uses a new blush color.

In 2275, the Digital Makeup Artist 520 may provide instruction for applying eyebrow mechanical pencil with light strokes. In 2277, the Digital Makeup Artist 520 may provide instruction for combing through brows.

In 2279, the User 530 may input a command, such as PAUSE. The System 510 may perform a pause function, until the User 530 inputs a PLAY command.

In 2281, the Digital Makeup Artist 520 may provide instruction for selecting eye shadow of pink shade. In 2283, the Digital Makeup Artist 520 may provide instruction for selecting a foot applicator for applying eye shadow. In 2285, the Digital Makeup Artist 520 may provide instruction for applying the eye shadow to eye lids. In 2287, the Digital Makeup Artist 520 may provide instruction for performing blending into the crease with a fluffy blending brush.

In 2289, the User 530 may input a command, such as "RE-DO A STEP," to re do the blending. In 2291, the System 510 may restart the video from the beginning of the blending step.

In 2293, the Digital Makeup Artist 520 may provide instruction for creating a wing across each lid using a wing stencil. In 2295, the Digital Makeup Artist 520 may provide instruction for performing a step of applying mascara to lashes using a few swipes. In 2297, the Digital Makeup Artist 520 may provide instruction for applying a barely-there lip gloss.

In 2299, the User 530 may input a statement that the lip gloss is too light, and ask if the lip gloss can be toned up.

At some future time when the video has completed, in 2301, the Digital Makeup Artist 520 may output a question as to whether the user would like to save the finished look. In 2303, the User 530 may choose to save the look and instruct the System 510 to save the look. In 2305, the System 510 saves the final look to the database 107. In some embodiments, the final look may be saved in the database as a preferred look for a certain type of look, such as a personal eGirl look. For example, the eGirl look created using a tutorial may be saved as a preferred look for the egirl look that was initially described (see 503 in FIG. 5). The final look may also be transported to other platforms, such as social media platforms or video conferencing platforms. Some current social media platforms where a user may post a photograph or video include Facebook, LinkedIn, Instagram, TikToc, and Snapchat, to name a few. Some current video conferencing platforms include Microsoft Teams, FaceTime, Google Hangouts or Google Meet, Zoom, GoToMeeting, Skype, to name a few. In addition, changes that were made during the tutorial, such as choice of shade of a color, finish of a color, may be stored as look preference data.

In some embodiments, in 2305, the System 510 may save to the database 107 one or more mask filters associated with the creation of the final look. The one or more mask filters may be transported to other platforms, and may be used to create a custom look for the other platform.

In addition to providing a tutorial service for creating a custom look, the Digital Makeup Artist 520 can provide personal makeup consultation. The Digital Makeup Artist 520 may provide advice on how to boost the user's makeup look, or provide advice on improvements that may be made to the user's makeup application technique. The Digital Makeup Artist 520 may provide advice on a makeup application technique that may better address a problem area, or bring out a special facial feature. The Digital Makeup Artist 520 may provide advice on makeup application that may be appropriate for time of day (morning, afternoon, evening), an expected place where the user will be going to (mostly indoors with artificial lighting, mostly outdoors with sun exposure and lighting), or current skin conditions (dry skin). The Digital Makeup Artist 520 may provide advice on ways to bring out the user's personality.

Figure 23:
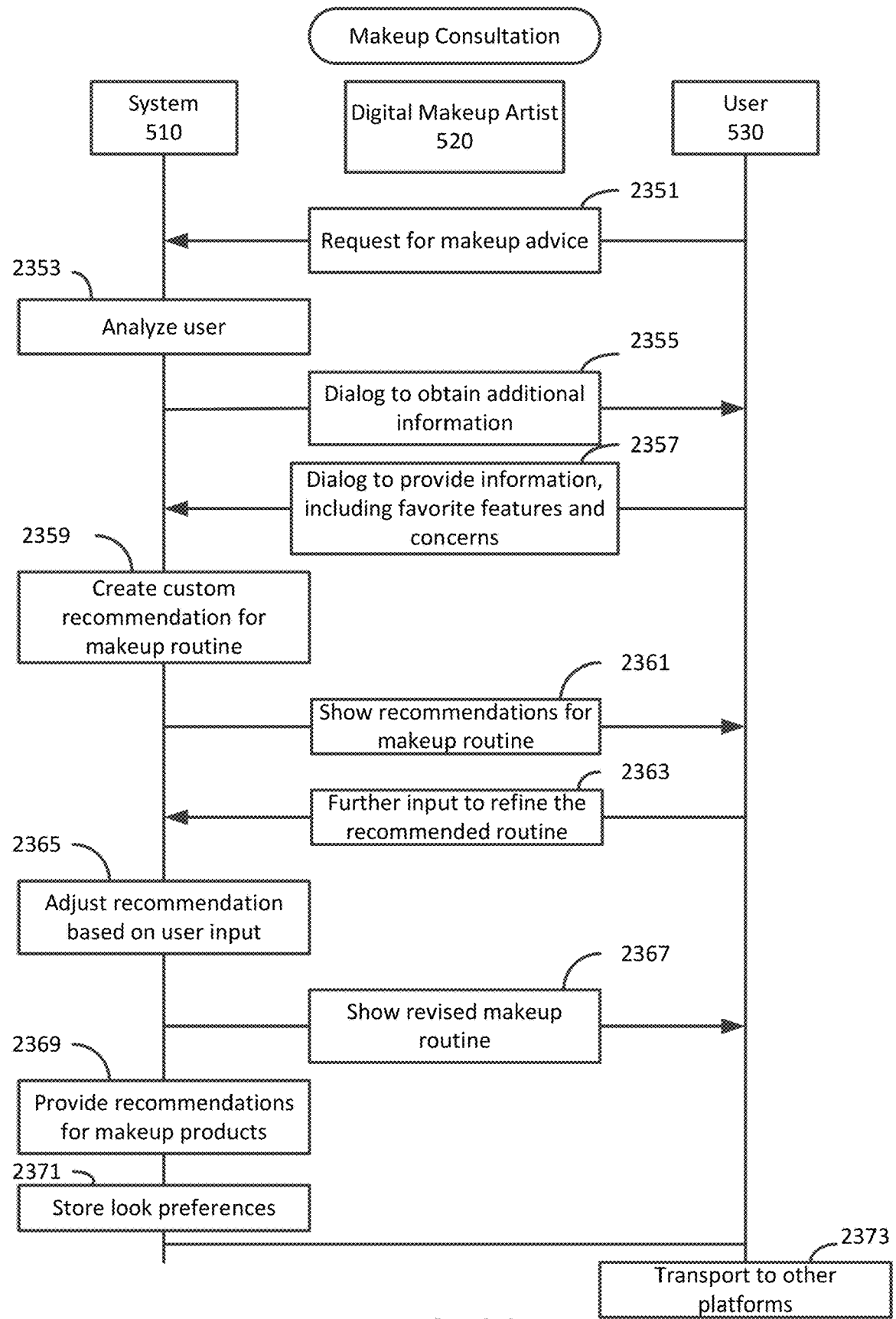
FIG. 23 is a sequence diagram for interaction between a digital makeup artist and a user for a makeup consultation in accordance with an exemplary aspect of the disclosure.
Figure 24A:
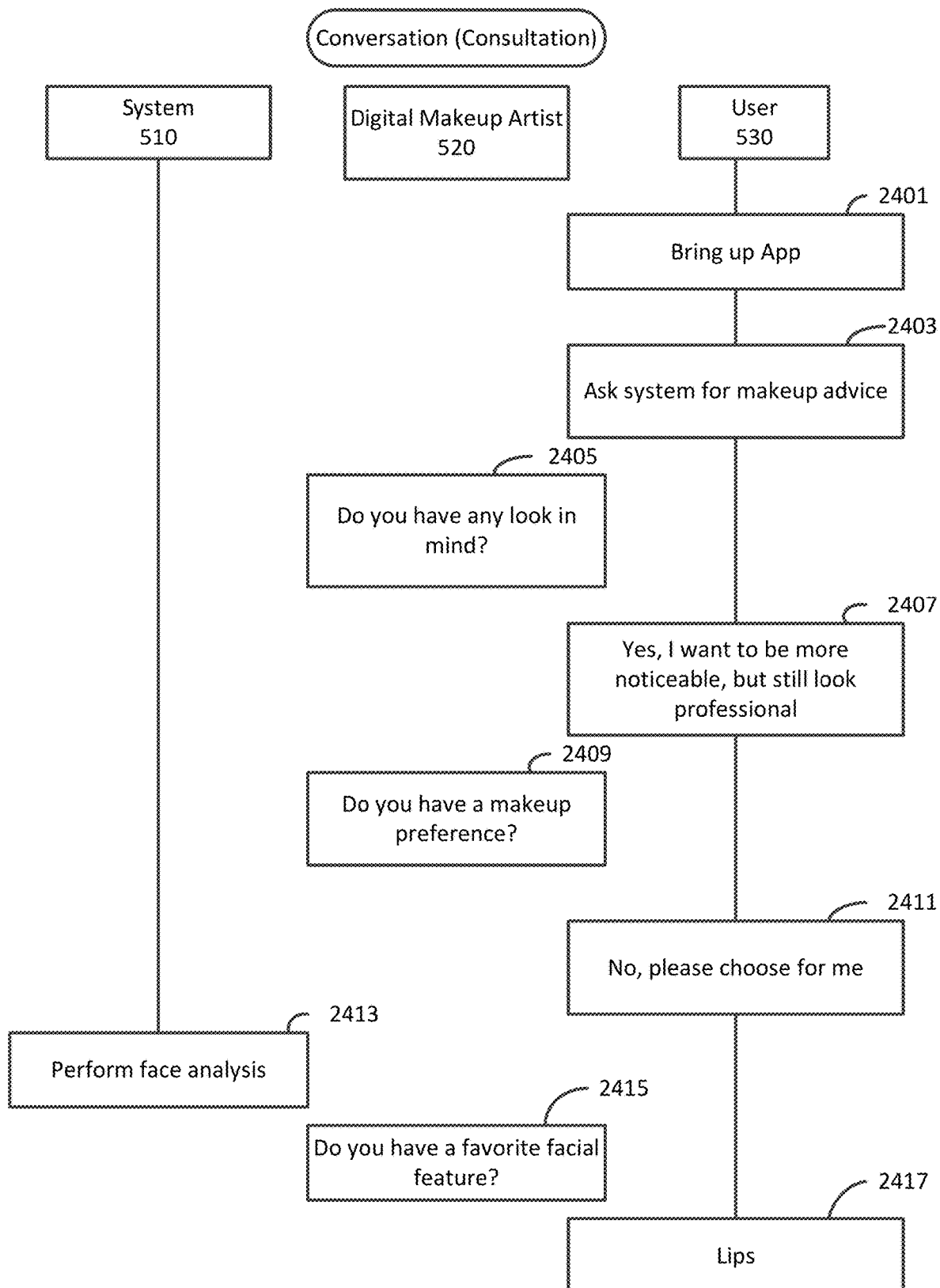
FIGS. 24A to 24D are a sequence diagram for an exemplary interaction using the digital makeup artist for a makeup consultation in accordance with an exemplary aspect of the disclosure.
Figure 24B:
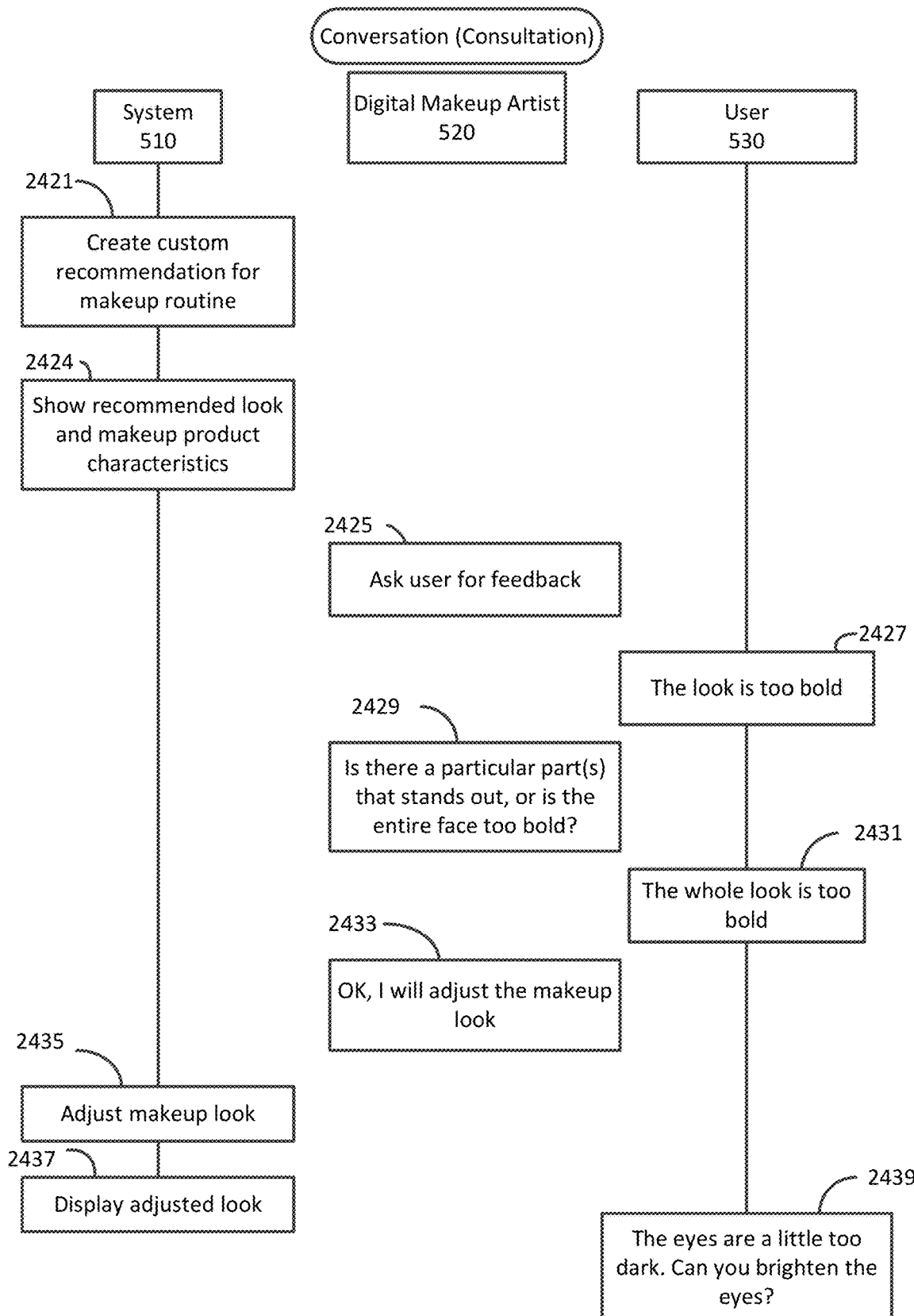
Figure 24C:
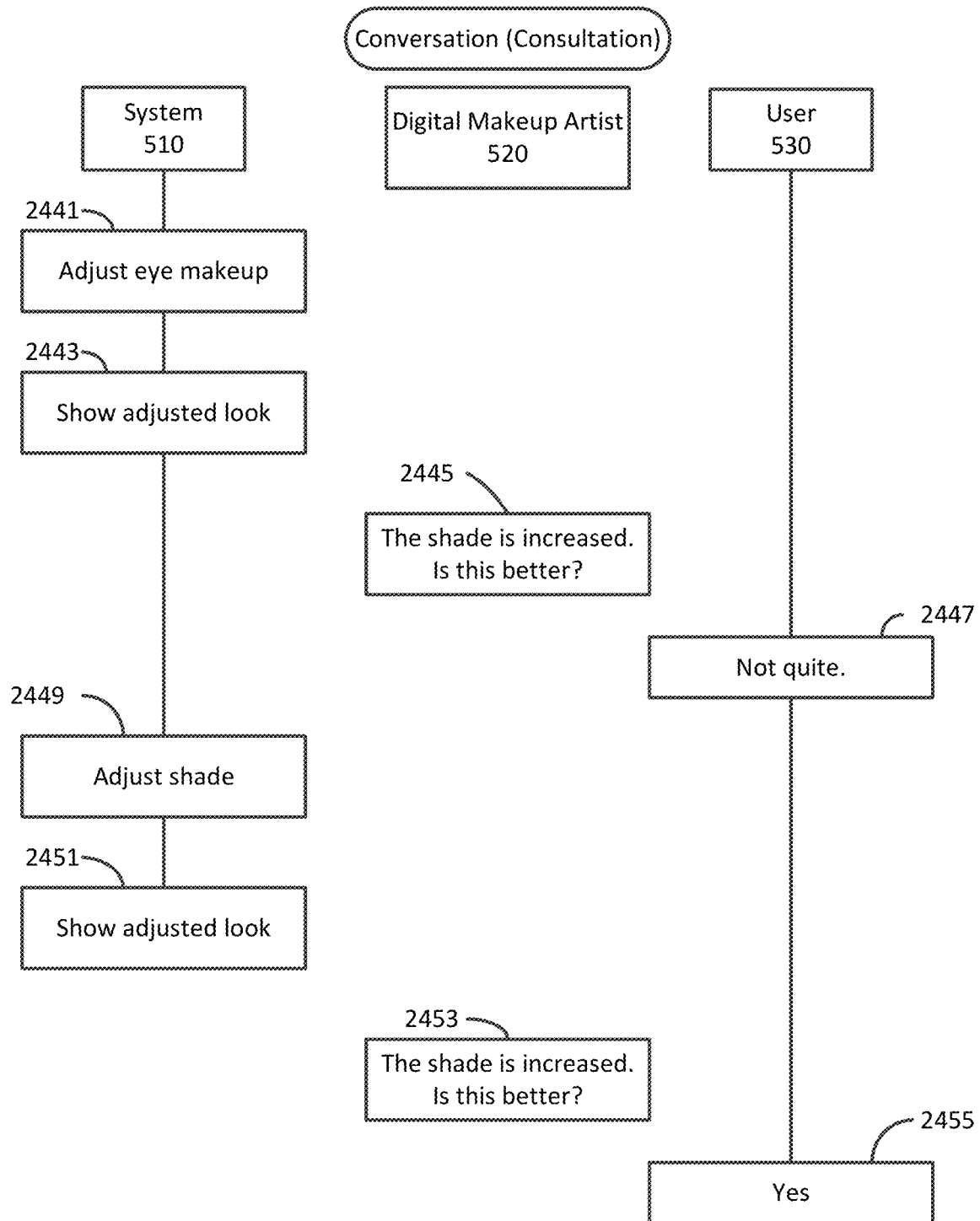
Figure 24D:
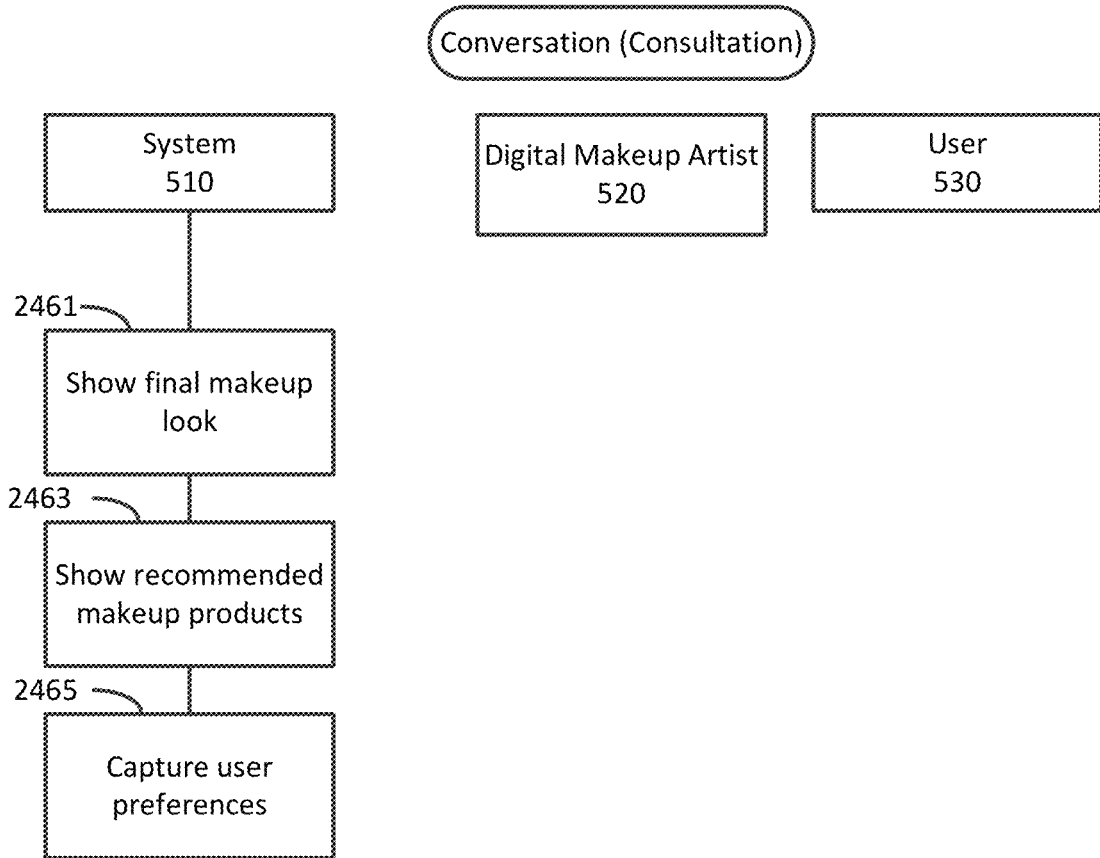

FIG. 23 is a sequence diagram for interaction between a digital makeup artist and a user for a cosmetic consultation in accordance with an exemplary aspect of the disclosure.

As stated above, the User 530 may be given a choice of using the Digital Makeup Artist 520 for teaching in a tutorial or providing advice in a cosmetic consultation session. In 2351, the User 530 may request cosmetic advice via the user interface window 310 (see FIG. 3). In 2353, the System 510 may request that the User 530 take a photograph or video of their face. In a similar manner as in the above for the tutorial, the System 510 may analyze an image of the user's face to identify face parts, sense skin tone, lip color, hair color, and skin texture. In 2355, the System 510 may conduct an interactive dialog with the User 530 to obtain further information related to a user's needs, including skin condition, indoor/outdoor looks, favorite facial features, and any facial feature concerns. In 2357, the User 530 may input information of skin conditions, e.g., dry skin, indoor/outdoor looks, favorite features and facial feature concerns.

Provided user input information and preference information that may have been previously stored in the database 107, and mask filters for various types of looks stored in the database 107, in 2359, the System 510 creates one or more custom recommendations for cosmetic routines. As discussed above, custom recommendations may be obtained using a recommender system. The recommender system 1000 may be used for retrieving makeup filters to be used in creating the custom recommendations for makeup routines and may be used for retrieving cosmetic routines, such as for skin care. In 2361, the System 510 may display the retrieved one or more recommended cosmetic routines. Makeup routines may be generated using the blending process shown in FIG. 20.

The recommender system 1000 includes a recommendation engine 1007 that retrieves and ranks recommended makeup filters. The recommendation engine 1007 may also draw from an external repository for additional information, including one or more of frequently asked questions and answers, common makeup looks, cosmetic products for specific skin types and conditions, and ethnicity. The recommender engine 1007 may further draw from an external repository of cosmetic categories, including skin care, and makeup that has skin care qualities, Makeup that has skin care qualities may include foundation with SFP for protection from sunlight, makeup with anti-aging qualities. In the case of application of a particular virtual makeup, a recommended makeup filter may be for favorite features and facial feature concerns that the user has input in step 2357.

In one or more embodiments, as described above the recommender engine 1007 may be supplemented with a machine learning model to recommend a shade of makeup based on skin undertone.

In some embodiments, in 2363, the user interface window 310 may take input from the User 530 to refine, make adjustments to, a recommended cosmetic routine. The further user input can be in the form of refinements or adjustments in particular features shown in the recommended routine. For example, the user may input that the lipstick color is too bold. The further user input can be in the form of refinements or adjustments in the overall makeup routine. For example, the user may input that the makeup routine is too bold, or that the user would prefer longwear for makeup. In 2365, the System 510 may make adjustments to the recommended makeup routine in accordance with the user input and makeup look data that matches the type of adjustment. For example, the System 510 may make an adjustment by retrieving a mask filter for longwear makeup that has been stored in the database 107. In 2367, the System 510 may generate and display the revised makeup routine for the user's face image using the retrieved mask filter. In 2369, the System 510 may provide recommendations for makeup products that may be used to create the finished face image using the makeup routine.

In addition, in 2371, the System 510 may store the finished face image and adjustments to the makeup routine used in creating the finished face image in the database 107 as makeup look preferences. For example, the mask filter for longwear makeup may be stored with a label that it is a makeup look preference (makeup filter) for a makeup routine (look) in a feature matrix, as in FIG. 11.

In one or more embodiments, in 2373, the User 530 may choose to transport/publish the created finished face image to a platform that provides live video or still images that the user would like to make a presence. Platforms that provide live video include social media platforms and video conferencing platforms, including Facebook, Linked-in, Google Hangouts or Google Meet, FaceTime, Microsoft Teams, TikToc, Zoom, to name a few.

In order to explain the Digital Makeup Artist 520, an example operation is provided FIGS. 24A to 24D. FIGS. 24A to 24D are a sequence diagram for an exemplary interaction using the digital makeup artist for a makeup consultation in accordance with an exemplary aspect of the disclosure. The sequence diagram of FIGS. 24A to 24D includes operations and communication by a System 510, the Digital Makeup Artist 520 and a User 530.

In 2401, the User 530 may select a mobile application for the Digital Makeup Artist. When provided with a user interface window 310, in 2403, the User 530 may ask to obtain makeup advice. In 2405, the Digital Makeup Artist 520 may ask whether the user has a preferred look that they wish for advice about. In 2407, the User 530 may provide an answer that further defines the desired look. The Digital Makeup Artist 520 may further narrow down the type of advice to give by, in 2409, asking the user if they have a makeup look preference. The User 530 may provide an answer that indicates that they do not have a preference, but, in 2411, would rather have the System 510 choose a look.

In 2413, the System 510 may request that the user take a photo or video of their face and will perform analysis on the image of the user's face. The results of the analysis may include location of parts of the user's face, and characteristics such as skin color, skin texture, lighting, as well as previous look preferences.

In 2415, the Digital Makeup Artist 520 may ask whether the user has a favorite facial feature. The User 530 may respond with one or more favorite facial features, for example, lips as in 2417. In 2421, the System 510 may create a custom recommendation for one or more makeup routines. In 2423, the System 510 may display the makeup routines and makeup product characteristics. In 2425, the Digital Makeup Artist 520 may ask the user whether they want to have adjustments made to a recommended makeup routine. In 2427, the User 530 may provide a response, such as that the makeup look is too bold.

In 2429, the Digital Makeup Artist 520 may respond by asking whether it is a particular part, or parts, of the face that stand out, or is the entire face too bold. In 2431, the User 530 may respond that the whole look is too bold. In 2433, the Digital Makeup Artist 520 may inform the User 530 that an adjustment will be made to the makeup look.

In 2435, the System 510 performs an adjustment to the makeup look which may involve retrieving a mask filter from database 107, and the choice of mask filter may take into account past look preferences. In 2437, the System 510 may display the adjusted makeup look. In 2439, the User 530 may review the adjusted makeup look, and provide further feedback, such as that the eyes look a little too dark, and request that the eyes be brightened.

In 2441, the System 510 may make an adjustment to the makeup look, and in 2443, display the further adjusted look. In 2445, the Digital Makeup Artist 520 may inform the user that the system has increased the shade of the eye shadow, and ask the user if that adjustment sufficiently improves the brightness of the eyes. In 2447, the User 530 may respond with a statement that the adjustment is in the right direction, but might be better if a little more adjustment is made.

In 2449, the System 510 may adjust the shade further, and in 2451, may display the further adjusted look. In 2453, the Digital Makeup Artist 520 may again inform the user that the system has increased the shade, and again ask the User 530 if the adjustment is sufficient. In 2455, the User 530 may respond that the adjustment looks good.

Once a makeup look is completed, in 2461, the System 510 may display the final makeup look. In addition, in 2463, the System 510 may display the makeup products that may be used to create the final makeup look, and in 2465, save the makeup routine, final makeup look, and adjustments that were made, as user look preferences in the database 107.

Through interaction with the Digital Makeup Artist 520, a User 530 can improve their makeup looks, and improve their makeup application techniques. The Digital Makeup Artist 520 provides makeup advice that is tailored to the user. The Digital Makeup Artist 520 continues to improve its recommendations through an accumulation of user look preferences and custom looks. The Digital Makeup Artist 520 can try on makeup looks for a user before the user applies makeup to their own face, and teaches the user how to apply the makeup to create a custom look. In addition, the Digital Makeup Artist 520 can create custom makeup looks based on stored look preferences and information about the user's facial features.

In an embodiment, the words "a," "an" and the like generally carry a meaning of "one or more," unless stated otherwise.

Numerous modifications and variations of the present invention are possible in light of the above teachings. For example, data gathered from various consumers' skin tones and texture will allow scaling of the artificial neural network to more than a single consumer. The artificial neural network will be able to predict for each product shade the rendering of new cosmetic formula. It is therefore to be understood that within the scope of the appended claims, the invention may be practiced otherwise than as specifically described herein.

The invention claimed is:

1. A digital makeup artist system, comprising:
 a mobile device having a display device, computation circuitry, and a memory;
 a database system storing cosmetic routine information, common makeup looks, cosmetic products for skin types and ethnicity, and user look preferences of a user;
 a machine learning system for analyzing an image of a face; and
 the mobile device includes a user interface for interacting with a digital video makeup artist, wherein the digital video makeup artist performs an interactive dialog with the user in order to capture needs of the user, including one or more of facial problem areas, favorite facial features;
 the computation circuitry is configured to:
 input a face image of the user,
 analyze, via the machine learning system, the user's face image to identify face parts, and
 generate image frames for a video to be displayed on the display device in synchronization with the interaction with the digital video makeup artist,
 wherein the image frames are generated based on the analyzed face image of the user, the needs of the user obtained through the interactions with the user, one or more of the stored cosmetic routine information, common makeup looks, cosmetic products for skin types and ethnicity, and the user look preferences,
 wherein an input from the user includes a command to make an adjustment to the generation of image frames for adjusting a cosmetic routine, in which the computation circuitry is configured to generate adjusted image frames and replaying the video including the adjusted image frames.

2. The digital makeup artist system of claim 1,
wherein the computation circuitry is configured to play a video by displaying the generated image frames at a predetermined playback rate,
wherein the video includes chapters, where each chapter is a step in a makeup routine, and
wherein the input from the user includes a video control command to control playing of the video.

3. The digital makeup artist system of claim 1,
wherein the command is a video control command including one of slow down playback rate, pause playback, restart from a beginning of a step, skip forward to a next step in a video.

4. The digital makeup artist system of claim 3,
wherein when the input from the user is the slow down playback rate video control command, the computation circuitry reduces the playback rate by a percentage of a predetermined playback rate and stores in the database system an indication that a current chapter, that is playing when the command is input, is complicated.

5. The digital makeup artist system of claim 3,
wherein the input from the user is a restart from the beginning of a step video control command, in which the computation circuitry is configured to read a time point, that is playing when the command is input, and play the video starting from the frame at the time point.

6. The digital makeup artist system of claim 3,
wherein the computation circuitry is further configured to read a time point associated with a beginning of a current chapter that is playing and generate adjusted image frames for playing the video starting from the frame at the time point.

7. The digital makeup artist system of claim 6, wherein the adjustment to generation of image frames includes a change to a characteristic of a color of a makeup for a face part in the face image, and
wherein the characteristic of the color is one or more of coverage, shade, and finish.

8. The digital makeup artist system of claim 6, wherein the user input includes a type of look, wherein the adjustment to generation of image frames takes into account the user look preferences associated with the type of look.

9. The digital makeup artist system of claim 6, wherein a makeup look created based on the adjustment to generation of image frames is stored in the database as a preferred makeup look.

10. The digital makeup artist system of claim 1, wherein the computation circuitry is further configured to analyze, via the machine learning system, the user's face image to determine one or more of face shape, lip shape, eyelid shape, and hair style, and to analyze the user's face image to determine one or more of skin tone, eye color, hair color, and skin texture, and
wherein the image frames are generated based on cosmetic routines that are stored in a database in relation to stored face shape, lip shape, eyelid shape, hair style, skin tone, eye color, hair color, and skin texture.

11. The digital makeup artist system of claim 1, wherein the interactive dialog with the user that is conducted by the digital video makeup artist includes speech input, wherein the mobile device performs natural language processing on the speech input, and the digital video makeup artist outputs a speech response.

12. The digital makeup artist system of claim 11, wherein the interactive dialog with the user includes the digital video makeup artist speaking a question in order to obtain information about condition of the user's skin.

13. The digital makeup artist system of claim 11, wherein the interactive dialog with the user includes the digital video makeup artist speaking a question in order to obtain information about the user's facial problem areas.

14. The digital makeup artist system of claim 12, wherein the interactive dialog with the user includes the digital video makeup artist receiving a speech input indicating that the user's skin is dry, and
wherein the image frames are generated based on cosmetic routines that are stored in relation to the indication that the user's skin is dry.

15. The digital makeup artist system of claim 1, wherein the cosmetic routine information and cosmetic products stored in the database system are for skin care, and
wherein the image frames are generated based on the cosmetic routine information and cosmetic products for skin care.

16. The digital makeup artist system of claim 1, wherein the cosmetic routine information and cosmetic products stored in the database system are for skin care-type makeup, and
wherein the image frames are generated based on the cosmetic routine information and cosmetic products for skin care-type makeup.

17. The digital makeup artist system of claim 16, wherein the skin care-type makeup includes cosmetic products that have anti-aging qualities,
wherein the image frames are generated based on cosmetic routines that are stored in relation to applying the cosmetic products that have anti-aging qualities.

18. The digital makeup artist system of claim 1, wherein the image frames are generated based on the analyzed face image of the user including skin tone in order to provide cosmetic routines that use a shade that is optimal for the skin tone.

19. The digital makeup artist system of claim 1, further comprising a skin undertone machine learning model for choosing a shade of a cosmetic product that is appropriate for a particular skin undertone of the face image.

20. The digital makeup artist system of claim 19, wherein the cosmetic product is a foundation, and
wherein the skin undertone machine learning model is for choosing the foundation that is appropriate for the particular skin undertone of the face image.

* * * * *